(12) United States Patent
Wang et al.

(10) Patent No.: US 9,646,226 B2
(45) Date of Patent: May 9, 2017

(54) INSTANCE-WEIGHTED MIXTURE MODELING TO ENHANCE TRAINING COLLECTIONS FOR IMAGE ANNOTATION

(71) Applicant: The Penn State Research Foundation, University Park, PA (US)

(72) Inventors: James Z. Wang, State College, PA (US); Neela Sawant, Seattle, WA (US); Jia Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 424 days.

(21) Appl. No.: 14/254,437

(22) Filed: Apr. 16, 2014

(65) Prior Publication Data

US 2014/0307958 A1    Oct. 16, 2014

Related U.S. Application Data

(60) Provisional application No. 61/812,491, filed on Apr. 16, 2013.

(51) Int. Cl.
*G06K 9/62* (2006.01)

(52) U.S. Cl.
CPC ............ *G06K 9/6256* (2013.01); *G06K 9/62* (2013.01)

(58) Field of Classification Search
CPC .......... G06F 17/3028; G06F 17/30247; G06F 17/30811; G06F 17/30814; G06F 17/30253; G06F 17/30707; G06F 17/30796; G06F 17/30259; G06F 17/30598; G06F 17/30705; G06K 9/00268; G06K 9/00624; G06K 9/00664; G06K 9/00684; G06K 9/628;
(Continued)

(56) References Cited

U.S. PATENT DOCUMENTS

| 8,418,249 | B1 * | 4/2013 | Nucci | G06F 21/552 |
| | | | | 706/20 |
| 8,533,134 | B1 * | 9/2013 | Zhao | G06F 17/30705 |
| | | | | 706/12 |

(Continued)

OTHER PUBLICATIONS

J. Li, J.Z. Wang, "Real-time Computerized Annotation of Pictures," IEEE Trans. Pattern Anal. Mach. Intell., 30 (6):985-1002, 2008.

(Continued)

*Primary Examiner* — Vu Le
*Assistant Examiner* — Aklilu Woldemariam
(74) *Attorney, Agent, or Firm* — Dinsmore & Shohl LLP

(57) ABSTRACT

Automatic selection of training images is enhanced using an instance-weighted mixture modeling framework called ARTEMIS. An optimization algorithm is derived that in addition to mixture parameter estimation learns instance-weights, essentially adapting to the noise associated with each example. The mechanism of hypothetical local mapping is evoked so that data in diverse mathematical forms or modalities can be cohesively treated as the system maintains tractability in optimization. Training examples are selected from top-ranked images of a likelihood-based image ranking. Experiments indicate that ARTEMIS exhibits higher resilience to noise than several baselines for large training data collection. The performance of ARTEMIS-trained image annotation system is comparable to using manually curated datasets.

10 Claims, 16 Drawing Sheets

(58) Field of Classification Search
CPC ...... G06K 9/46; G06K 9/6256; G06K 9/6255;
G06K 9/00456; G06K 9/00671; G06K
9/3258; G06K 9/4676; G06K 9/6232;
G06K 9/6292; G06K 9/6272; G06K
2009/6213; G06K 9/00711; G06K
9/00523; G06K 9/00536; G06K 2209/27;
G06K 9/00677; G06K 9/6218; G06K
9/627; G06K 9/00281; G06K 9/4671;
H04N 1/00175; H04N 2201/3274; G06Q
10/10; G06Q 10/0639; G06Q 10/06398;
H04L 63/0227; H04L 63/1416; F41H
13/00; F41H 13/0093; G06T 17/00;
G06N 99/005; G06N 7/005
USPC ............... 382/118, 159, 180; 706/12, 20, 48
See application file for complete search history.

(56) References Cited

U.S. PATENT DOCUMENTS

| | | | | |
|---|---|---|---|---|
| 8,856,051 | B1* | 10/2014 | Song | G06N 99/005 706/12 |
| 8,954,358 | B1* | 2/2015 | Zhang | G06K 9/6292 382/225 |
| 8,996,350 | B1* | 3/2015 | Dub | G06F 17/30011 704/1 |
| 9,256,826 | B2* | 2/2016 | Srinivasan | G06N 5/02 |
| 2003/0004966 | A1* | 1/2003 | Bolle | G06F 17/30253 |
| 2003/0033347 | A1* | 2/2003 | Bolle | G06F 17/30253 718/107 |
| 2009/0204637 | A1* | 8/2009 | Li | G06F 17/3025 |
| 2010/0177956 | A1* | 7/2010 | Cooper | G06K 9/00664 382/159 |
| 2011/0072047 | A1* | 3/2011 | Wang | G06F 17/30265 707/776 |
| 2012/0269436 | A1* | 10/2012 | Mensink | G06K 9/00624 382/180 |
| 2012/0290511 | A1* | 11/2012 | Frank | G06N 99/005 706/12 |
| 2013/0315477 | A1* | 11/2013 | Murray | G06F 17/30247 382/159 |
| 2014/0029839 | A1* | 1/2014 | Mensink | G06K 9/6272 382/159 |
| 2014/0093174 | A1* | 4/2014 | Zhang | G06F 17/30259 382/190 |
| 2014/0193047 | A1* | 7/2014 | Grosz | G06F 3/1242 382/118 |
| 2014/0307958 | A1* | 10/2014 | Wang | G06K 9/6256 382/159 |

OTHER PUBLICATIONS

S. Choi, R. Wette, "Maximum Likelihood Estimation of the Parameters of the Gamma Distribution and their Bias," Technometrics, 11(4):683-690, 1969.

J. Deng, W. Dong, R. Socher, L-J. Li, K. Li, and F.-F. Li,"Imagenet: A Large-scale Hierarchical Image Database," in Proc. CVPR, pp. 248-255, 2009.

X. Phan, L. Nguyen, and S. Horiguchi, "Learning to Classify Short and Sparse Text and Web with Hidden Topics from Large-scale Data Collections," in Proc. WWW, pp. 91-100, 2008.

D. Liu, X.-S. Hua, L. Yang, M. Wang, and H.-J. Zhang, "Tag Ranking," in Proc. WWW, pp. 351-360, 2009.

J. Verbeek, M. Guillaumin, T. Mensink, and C. Schmid, "Image Annotation with Tagprop on the MIRFLICKR Set," in Proc. ACM MIR, pp. 537-546, 2010.

G. Zhu, S. Yan, and Y. Ma, "Image Tag Refinement Towards Low-rank, Content-tag Prior and Error Sparsity," in Proc. ACM Multimedia, pp. 461-470, 2010.

P. Huang, D. Zhang, "Locality Sensitive C-means Clustering Algorithms," Neurocomput., 73(16-18):2935-2943, 2010.

T. Tao, C. Zhai, "Regularized Estimation of Mixture Models for Robust Pseudo-relevance Feedback," in Proc. ACM SIGIR, pp. 162-169, 2006.

J. Yu, M. Yang, and E. Lee, "Sample-weighted Clustering Methods," Comput. Math. Appl., 62(5):2200-2208, 2011.

R. Fergus, P. Perona, and A. Zisserman, "A Visual Category Filter for Google Images," in Proc. Computer Vision, 3021, pp. 242-256, 2004.

J. Li, X. Gao, and L. Jiao, "A Novel Typical-sample-weighted Clustering Algorithm for Large Data Sets," in Proc. Comput. Intell. Security, pp. 696-703, 2005.

F. Schroff, A. Criminisi, A. Zisserman, "Harvesting Image Databases from the Web," IEEE Trans. Pattern Anal Mach. Intell, 33:754-766, 2011.

J. Tang, S. Yan, T.-S. Chua, and R. Jain, "Label-specific Training Set Construction from Web Resource for Image Annotation," J. Signal Processing, vol. abs/1107.2859, 2012.

\* cited by examiner (a) Inaccurately tagged images (b) Incompletely tagged images

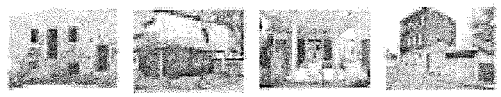
FIG – 8A Abandoned
FIG – 8B Deutschland
FIG – 8C Kids
FIG – 8D Eye
FIG – 8E Butterfly
FIG – 8F Window
FIG – 8G Racing
FIG – 8H Food
FIG – 8I Rust
FIG – 8J Purple
FIG – 8K Train
FIG – 8L Skyline
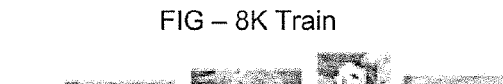
FIG – 8M Bear
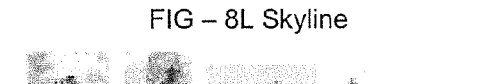
FIG – 8N Jump

FIG – 8O Interior

INSTANCE-WEIGHTED MIXTURE MODELING TO ENHANCE TRAINING COLLECTIONS FOR IMAGE ANNOTATION

REFERENCE TO RELATED APPLICATION

This application claims priority from U.S. Provisional Patent Application Ser. No. 61/812,491, filed Apr. 16, 2013, the entire content of which is incorporated herein by reference.

GOVERNMENT SUPPORT

This invention was made with government support under Grant Nos. IIS0347148, IIS0949891, and OCI0821527 awarded by National Science Foundation. The Government has certain rights in the invention.

FIELD OF THE INVENTION

This invention relates generally to automatic image annotation and, in particular, to the use of instance-weighted mixture modeling in training collections for image annotation.

BACKGROUND OF THE INVENTION

Automatic image annotation is a focal problem in image processing and computer vision. Annotation systems can be developed using generative modeling [2], support vector machines, visual templates, latent space models, and more recently through joint word-image embedding and kernel learning. A majority of techniques depend on pre-selected training images and invest many hours to collect them.

In recent years, easy access to loosely labeled Web images has greatly simplified training data selection. Search engines retrieve potential training examples by comparing concept names with image labels (user-assigned tags or surrounding-text keywords). In this context, a concept is illustrated by all images labeled with the concept name and an image with multiple labels exemplifies co-occurring concepts. The retrieved images could be directly used to train annotation systems, except that they are often irrelevant from a machine learning perspective. FIG. 1 shows noisy images associated with the concept castle. As many as 85% of Web images can be incorrectly labeled. Even user-assigned tags are highly subjective and about 50% have no relation to visual content. Tags appear in no particular order of relevance and the most relevant tag occurs in top position in less than 10% of the images. Consequently, several strategies have been proposed to refine retrieved collections.

ImageNet is a crowd-sourcing initiative to manually validate retrieved images. This process results in few errors, but takes years to gather sufficient data for a large concept vocabulary. Algorithmic training data selection provides a necessary trade-off between efficient automation and selection accuracy wherein potentially noisy examples are filtered using statistical learning techniques. Noise mitigation may be posed as a classification problem where a support vector machine (SVM) is trained to distinguish images tagged with a specific concept from those not tagged with that concept. Alternately, a relevance ranking problem can be formulated where images are ranked in the order of SVM classification margin or other statistical measures. For example, unsupervised clustering is useful to learn a concept-specific static distribution of data and rank images in the order of the chosen cluster measure (mixture likelihood or distance from the nearest prototype). Top ranked images can be used to train annotation systems and low ranked images are discarded as noise.

The problem of automatic training data selection is similar to statistical outlier rejection which works on the general assumption that outliers are sparse and distinguishable from the 'normal' data represented by a statistical reference model. The high level of noise associated with user-tagged images grossly violates this assumption.

To illustrate this problem, we created a simplified two-dimensional visualization of 647 Flickr images tagged with a specific concept. FIG. 2 shows several training data selection scenarios using heat-maps, where the color of each point can be mapped to a numeric relevance score using the associated color scale. FIG. 2A depicts the selection of all user-tagged images assuming reliability of tags, an assumption that completely breaks down when compared with the manual relevance assessment in FIG. 2B. In this particular example, nearly 34% of images are noisy, highlighting the fact that noise need not be sparse or separable[1].

[1] The outlier inseparability presents an interesting perspective for manual training data selection. Even if manual selection filters out all noisy images, subsequent statistical image annotation algorithms may continue to mistake similar images for relevant examples, especially in the high-density region of feature space—a classic outcome of the semantic gap.

Support vector machines and K-Means clustering do not specifically account for noise in statistical reference learning. To apply classification-based SVM, an additional collection of images not tagged with the target concept is collected as the negative class. For SVM classifier to be effective, it is imperative that the chosen negative examples match the noisy positive examples or else the classifier may overfit the noise. FIG. 2C shows the SVM scores based on classification margin.

Given its computational efficiency and simple implementation, K-Means is commonly used to select training examples based on the proximity of an image from the nearest cluster prototype. FIG. 2D shows the output of K-Means algorithm seeded with 20 clusters in K-Center initialization where even the noisy examples get a high score due to outlying clusters. A robust ranking cannot be guaranteed due to the sensitivity to outliers and initialization conditions.

SUMMARY OF THE INVENTION

Our approach is based on the observation that the distribution of relevant images has a more regular form compared to noise, thereby resulting in a higher signal to noise ratio at the modes of the distribution as opposed to its boundaries. In that case, the precision of training data selection may be enhanced by tapping the high-likelihood region of the distribution. This in turn evokes a causality dilemma because the distribution parameters cannot be robustly determined without suppressing the effect of outliers and outliers cannot be suppressed without a good reference distribution.

We propose a new instance-weighted mixture-modeling scheme that simultaneously estimates mixture parameters and instance weights. It is named ARTEMIS after Automatic Recognition of Training Examples for Modeling Image Semantics. In this parametric scheme, the reference model for each concept is a mixture model of visual and textual features computed from images tagged with the target concept. Similar to K-Means, the ARTEMIS initialization stage assigns equal weights to all data instances. However, it then deviates by systematically learning unequal weights to curb the contribution of noisy images in iterative reference model learning. Training data is selected by ranking images in the decreasing order of mixture likelihood. FIG. 2F shows the output of ARTEMIS initialized using the same conditions as in K-Means clustering of FIG. 2D. The algorithm converges to identify the high-density region of relevant images, thereby improving the precision of training data selection.

The mixture modeling approach of ARTEMIS is suitable to model complex feature distributions and components with different densities. As ARTEMIS uses a parametric probabilistic data model and the ranking is based on the overall mixture likelihood, the scores generated by ARTEMIS have a more global interpretation of image typicality. Therefore even though ARTEMIS emphasizes assigning higher scores for points in highly populated regions, image ranking is not susceptible to very local and possibly spurious density variations. As a further explanation, instance weighting alone can be achieved using simple local density estimation where the score of a data point is the count of neighborhood points that lie within a pre-determined distance of that point. However, such approach may be prone to selecting noise in a spuriously dense local neighborhood before the true signal from a possibly less dense component. Further, the implementation of such counting approach is non-trivial in determining a suitable distance measure and thresholds applicable to high-dimensional, multimodal feature spaces. FIG. 2E illustrates the output of the counting approach.

Instance-weighted mixture modeling is a difficult problem with two important challenges:
  Identification of a suitable distribution function: Mixture modeling assumes data to follow one specific distribution and performs best if the exact distribution is captured. It is unlikely that datasets corresponding to different concepts from a large vocabulary will conform to one model. In fact, Quack et al. demonstrate the variety by presenting examples of feature distance histograms over large datasets. This makes parametrization non-trivial, particularly if one or more features are irrelevant for the learning task.
  Optimization of a complex objective function: Estimation of instance-weighted likelihood with varying weights is a relatively new problem. Using arbitrary data distributions can result in complex objective functions which cannot be optimized using closed-form solutions. Using slower gradient-descent methods may diminish the computational advantages over simple clustering algorithms that have an analytical solution.

We address these challenges using hypothetical local mapping (HLM) [2] to model and combine multiple features without directly dealing with their observed distributions. HLM together with an entropy regularization of instance weights, yields an efficient, analytical, and generalized solution to the complex optimization problem. The reference models can be stored in a database if more training examples need to be inspected in the future.

The contributions of the method include at least the following:
  ARTEMIS is a unified training data selection framework to handle noisy user-tagged images. It outperforms alternative techniques by using efficient instance weight learning and feature combination. On a benchmark dataset, ARTEMIS achieves a mean average precision of 0.47 which compares favorably with 0.41 for K-means and 0.39 for ranking SVM. Relevant images can be identified from incompletely tagged images.
  ARTEMIS contracts the gap between the quality of training data collected using manual and automatic training data selection. Our experiments indicate that an annotation system trained using ARTEMIS performs similar to using manually curated datasets such as ImageNet and COREL. For the ARTEMIS-trained system, the accuracy in top ten annotations is 22%.

The techniques are generalizable to other domains dealing with noisy data.

BRIEF DESCRIPTION OF THE DRAWINGS

FIG. 1A illustrates Incorrectness: i.e., the concept cannot be inferred from the picture;

FIG. 1B illustrates Polysemy: a different object has the same label;

FIG. 1C illustrates Atypicality: the silhouette of a sand castle is an atypical example;

FIG. 1D illustrates Incompleteness: a relevant example has not been labeled;

FIG. 2A shows all images are equally relevant solely based on the presence of the target concept in user tags;

FIG. 2B shows manual assessment distinguishes noisy images denoted in blue from relevant images marked in red. The overall quantity and distribution of noise underscores the challenges faced by automatic training data selection;

FIGS. 2C and 2D show the image relevance estimated by SVM and K-Means falsely ranks noisy examples higher;

FIG. 2E illustrates a density estimation approach to select examples from locally dense neighborhoods may be inadequate to process complex distributions;

FIG. 2F shows how ARTEMIS selects training examples from the high-likelihood region of distribution density that better correlates with manual assessment;

FIGS. 8A-8O present the top four examples selected by ARTEMIS to train image annotation models of specific concepts;

FIG. 13A shows Accuracy: the percentage of images correctly annotated by the $n^{th}$ word;

FIG. 13B shows Coverage: the percentage of images correctly annotated by at least one of the top n words.

DETAILED DESCRIPTION OF THE INVENTION

Figures 1A, 1B, 1C, 1D:
FIGS. 1A-1D show challenging Flickr examples for the concept castle. In particular

Section II discusses related work. Section III and Section IV present the instance-weighted mixture modeling algorithm and its properties, respectively. An overall framework to use ARTEMIS for training image annotation systems is presented in Section V with experimental results in Section VI. We conclude in Section VII with a note on future work.

II. Related Work

This section presents the specific research on training data selection from noisy user-tagged images as well as a brief review of robust statistical learning. The discussion on instance-weighted clustering and entropy regularization is deferred until Section III-C to contextualize our approach.

Manual Selection:

Image annotation research has historically leveraged smaller but high-quality datasets created by rigorous manual inspection of images. Some newer approaches channel human efforts by engaging game-like interfaces and click-through data analysis. Manually verified images can also be used to bootstrap data selection in active or incremental learning framework. ImageNet is a crowd-sourced dataset that provides organized access to hundreds of images for a large number of WordNet categories. Research using this dataset highlights problems in large-scale training data selection and image annotation.

Clustering:

Clustering is an intuitive approach used in several works for identifying cluster prototypes as iconic images, computing inter-concept similarity, and facilitating semantic detection. Berg et al. clustered composition features to select images with large objects before applying nearest neighbor and K-medoids to filter noisy examples. Manual verification was intermediately employed to enhance precision. Lazebnik et al. applied geometric constraints verification to refine clustering. Tang et al. developed a semi-automatic technique to assess segment-level tag relevance by clustering corresponding features using locality sensitive hashing and manually verifying the largest feature cluster before selecting it for training. Fergus et al. used the random consensus (RANSAC) technique to robustly estimate the probabilistic model of web images. Outliers were rejected by comparing image rankings generated by different trials and identifying images that resulted in inconsistent groupings.

Support Vector Machines:

SVM classifiers can be trained using tagged images (with or without manual verification) to select more training data. One-class SVM (OCSVM) techniques may be used for unbalanced datasets when it is difficult to obtain negative class examples or when only very few positive examples are available. Given an input noise-level, OCSVM finds a hypersphere with the minimum volume surrounding the corresponding fraction of positive class samples. The hypersphere does not necessarily account for the multimodal nature of the data and previous studies have evaluated it over very few concepts.

Tag Refinement:

While the aforementioned techniques are specific to training data selection, tag refinement is a related approach to semi-supervised annotation of images without an intermediate training data selection step. It is a two-stage technique that first retrieves labeled images visually similar to the query image followed by a tag refinement scheme to select labels of the visual neighbors for query image annotation. The retrieval algorithm may use some form of K-nearest neighbor search (KNN) or graph mining, possibly made efficient using passive-aggressive low-dimensional embedding models, kernel methods, or feature compression.

Finally, training data selection may also be linked to Web search result ranking that focuses relevance estimation efforts on a limited set of top query results. Popular Web ranking techniques such as ranking SVM, passive-aggressive models, and boosting aim to directly optimize precision in top results using pair-wise constraints that rank relevant documents higher than irrelevant documents. This evokes a quadratic complexity not amenable to large-scale training data selection.

Different techniques offer different trade-offs for training data selection. A generative model-based approach such as ARTEMIS makes more assumptions about the data but provides computational efficiency in processing unseen images through stored concept reference models. The scores generated by ARTEMIS represent the overall likelihood of an image which is useful not only for the segregation of noise but also to identify which images are more representative than the others. Tag refinement techniques based on nearest neighbor analysis are model-free when they do not create a unique abstraction or an intermediate reference model of the target concept. Such techniques must access a large pool of labeled images to determine visual neighbors of the query and to build a tag ranking model over the corresponding labels. The advantage of this approach is that multiple tags can be processed at once. However, the speed and accuracy of analysis is closely tied to the size of the labeled dataset that can be efficiently processed at run time. As the scores of two images are based on their local neighborhoods, it is non-trivial to identify which image is more representative of the target concept.

Ensemble-Based Learning:

The classification or clustering-based paradigm to outlier rejection is the fundamental aspect of statistical learning from data. However, the stand-alone algorithm analysis might be insufficient when the effect of noise is deleterious. Random sample consensus (RANSAC) is a popular technique to improve parameter estimation where multiple trials are conducted, each on a small subset of data with the expectation that at least one clean subset will be generated to yield stable parameters. This process can be highly computation-intensive, especially in case of complex models. Alternately, bagging type of approaches can be developed where an ensemble of models is used instead of a stand-alone algorithm to generate a more robust prediction. Angelova et al. used discriminative models such as SVM as base classifiers and filtered examples on which the classifiers disagreed the most. Angluin et. al used the bagging approach to learn a classifier over multiple random subsets and selected the most consistent rule as prediction. Hong et al.

used an ensemble of multiple clustering results to filter examples yielding inconsistent results. In situations where auxiliary information about noise is available, it can be used to improve parameter estimation.

III. Instance-Weighted Mixture Modeling

We now present the mixture-modeling algorithm that forms the core of ARTEMIS. Each concept is represented as a joint mixture model of the visual and textual features of images tagged with the concept and learned from noisy Web images. Let an image be represented as $v_i$, $i=1, \ldots, N$ drawn independently from a J-component mixture model of the concept whose centroids are denoted as $c_j$, $j=1, \ldots J$. The j th feature type of an instance $v_i$ is denoted as $v_{i,j}$ and of a centroid $c_j$ as $c_{i,j}$, where $j=1, \ldots, F$ denotes the different feature types such as color, texture, shape, and words. A data point $v_i$ is associated with weight $w_i$ that reflects its concept-specific relevance. Without loss of generalization, we can assume weights to be non-negative and normalized i.e., $w_i \geq 0, \forall i$ and $$\sum_i w_i = 1.$$

The mixture parameters $\Theta$ and instance weight vector W are estimated by jointly optimizing weighted data likelihood in space $\Phi = \Theta \times W$.

$$\log L(\Phi) = \sum_{i=1}^{N} w_i \log \sum_{j=1}^{J} p(v_i, c_j; \Theta), \qquad (1)$$

For brevity, we denote $$\log \sum_{j=1}^{J} p(v_i, c_j; \Theta)$$

as $l_i$. Eq. 1 can be trivially optimized for fixed uniform or $j=1$ fixed non-uniform weights if the weights are known a priori. However, if weights are allowed to vary freely, the solution quickly converges to a degenerate case where the point with the highest likelihood is assigned a unit weight and all other points are assigned zero weights. In other words, if the likelihood of $v_i$ is denoted as $l_i$ and the likelihood of the maximum likelihood point is $l_{max}$, it can be easily shown that $$\sum_i w_i l_i < l_{max}.$$

Therefore, to allow all data points to fairly influence the estimation, we introduce a penalty term corresponding to the entropy regularization of weight distribution in the objective:

$$F = \sum_{i=1}^{N} w_i l_i^{-\kappa} \sum_{i=1}^{N} w_i \log w_i. \qquad (2)$$

The regulation factor $\kappa$ controls the degree to which outliers are penalized. If $\kappa=\infty$, all data points are forced to have equal weights, $\kappa=0$ corresponds to the degenerate condition. Eq. 2 can be optimized using an EM-type algorithm. The expectation step is similar to regular EM and involves computing posterior distribution of $c_j$ given $v_i$.

$$Q_i(c_j) = p(c_j | v_i; \Theta). \qquad (3)$$

The maximization step updates parameters to optimize the constrained weighted likelihood $$\sum_{i=1}^{N} w_i \sum_{j=1}^{J} Q_i(c_j) \log p(v_i, c_j; \Theta) - \kappa \sum_{i=1}^{N} w_i \log w_i, \qquad (4)$$

where the weight estimation is incorporated as a nested optimization sub-problem in the M-step of each EM iteration.

A. Selection of a Probability Distribution Function

As the optimization involves an arbitrarily large number of parameters, using deterministic annealing or gradient-based approaches may cause large computational overhead. Therefore, a critical decision lies in the choice of the distribution function $p(.)$. While estimation may be simplified assuming Gaussian distributed data, such assumption is often inconsistent with the real statistical distributions exhibited by different features. Further, different features follow different distributions and it is necessary to suitably combine features for concept modeling. To overcome these issues, we evoke the hypothetical local mapping (HLM) technique from our earlier work [2].

The key to hypothetical local mapping lies in the relationship between the parameters of a homoscedastic multivariate normal distribution and a gamma distribution. If $X = (X_1, X_2, \ldots, X_k)^T \in R^k$ is a multivariate normal random variable with mean $\mu = (\mu_1, \mu_2, \ldots, \mu_k)^T$ and covariance matrix $\Sigma = \sigma^2 I$ (I is the identity matrix), then the squared Euclidean distance $\|X-\mu\|$ follows a gamma distribution $(\Gamma:b,s)$ with scale parameter $b=k/2$ and shape parameter $s=2\sigma^2$. Consequently given a clustering solution, the neighborhood around each centroid can be fitted a scaled gamma distribution and used to infer the parameters of a hypothetical multivariate normal distribution whose instances would generate a similar distance profile. Formally the component distribution around a centroid a can be computed as:

$$g(\beta) = \left(\frac{1}{\sqrt{\pi b}}\right)^{2s} e^{\frac{-\|\beta - \alpha\|^2}{b}}, \qquad (5)$$

where $\beta$ is an image for which $\alpha$ is the nearest centroid. Such approximation corresponds to a one-to-one mapping between the hypothetical space and $R^k$ that maximally preserves the distances between images and their closest centroids.

In [2], HLM was proposed for D2-clustering of a non-vector 'bags of weighted vectors' feature space. After prototypes were generated, a single run of HLM was applied to learn the probability distribution based on the bag distances from the nearest prototypical bags. In our work, HLM is evoked for the purpose of efficiency and not so much from the limitation of non-vector feature spaces. HLM embedded within each EM iteration ensures tractable convergence properties in optimization. As different features are highly likely to be in different distributions, we apply HLM to separately estimate distribution functions of individual feature types. The use of HLM as a means of feature combination was not touched upon at all in [2]. The concept of instance-weighted learning and the underlying problem of choosing good training images were also irrelevant in that work.

The distribution of feature f is defined as:

$$p(v_{i,f} | c_{j,f}) = \left(\frac{1}{\sqrt{\pi b_f}}\right)^{2s_f} e^{-\frac{\|v_{i,f} - c_{i,f}\|^2}{b_f}}, \quad (6)$$

where $b_f$ and $s_f$ are the gamma parameters for the fth feature type. Given a feature type, we assume common shape and scale parameters for all components. Finally, features are probabilistically combined under the assumption of independence as follows, $$p(v_i | c_j) = \prod_f p(v_{i,f} | c_{j,f}). \quad (7)$$

For each mixture component, the feature types are independent and the corresponding parameters are independently optimized using the distance distribution within that feature type. Even though each mixture component estimates a single set of parameters for each feature type and the number of overall mixture components is the same, the variables are not independent in general given the complete mixture model. In other words, the complete mixture model can represent complex distributions as long as sufficient number of components are used, even if the same number of components are used for the joint representation of different features.

When different feature types have different complexity in their distributions, this will be reflected in the parameters for different feature types in the mixture model. For instance, a feature type with a relatively simple marginal distribution may have similar parameters across the mixture components, while a feature type with a more complicated marginal distribution may have high disparity in the parameters across components. Our approach is different than an alternate approach of learning mixture models for different feature types in a completely independent manner. For example, we do not learn a separate color mixture model, a separate texture color model, and a separate shape mixture model. In that scenario, even though different number of components can be used, the dependence between feature types is not modeled.

B. Analytical Solution to Instance Weighting

The proposed distribution function provides an efficient solution to the constrained optimization problem in Eq. 4. We first update centroids $c_h$, keeping weights fixed. That is, $$\frac{\partial}{\partial c_h}\left(\sum_{i=1}^N w_i \sum_{j=1}^J Q_i(c_j) \log \prod_f \frac{e^{-\frac{\|v_{i,f}-c_{j,f}\|^2}{b_f}}}{(\pi b_f)s_f}\right) = 0. \quad (8)$$

Maximizing with respect to each feature type, $$c_{h,f} = \frac{\sum_i w_i Q_i(c_h) v_{i,f}}{\sum_i w_i Q_i(c_h)}. \quad (9)$$

The distribution parameters are updated by computing the new distances of data points from their closest centroids and using maximum likelihood estimation for gamma parameters [1]. To update $w_i$, the following constrained optimization is used:

$$\underset{w_i}{\text{maximize}} \sum_i w_i l_i - K \sum_i w_i \log w_i, \quad (10)$$

$$\text{subject to } \sum_i w_i = 1, w_i \geq 0, i = 1, \ldots, N.$$

The Lagrangian is:

$$M = \sum_i w_i l_i - \kappa \sum_i w_i \log w_i + \lambda\left(1 - \sum_i w_i\right). \quad (11)$$

Differentiating Eq. 11 with respect to $w_i$ and simplifying, $$w_i e^{\frac{l_i - \lambda - \kappa}{\kappa}}. \quad (12)$$

Next, Eq. 11 is differentiated with respect to $\lambda$ and simplified, $$\lambda = \kappa\left(\log \sum_i e^{\frac{l_i}{\kappa}-1}\right). \quad (13)$$

Substituting Eq. 13 for $\lambda$, in Eq. 12.

$$w_i e^{\frac{l_i}{\kappa}} / \sum_m e^{\frac{l_m}{\kappa}}, \quad (14)$$

where recall that $l_i$ is the log-likelihood of a point $v_i$. The formula for weights indicates that each data point exercises an influence on density estimation that is proportional to its likelihood from the current mixture density. If noise is present in one or more feature spaces, the weight of a data point will be lowered even though the probabilities are bound in the range [O,1]. Consequently, typical examples with higher weights exercise greater influence and the effect of outliers iteratively decreases. Algorithm 1 summarizes the main steps of the mixture modeling approach.

---

Algorithm 1 Instance-Weighted Mixture Modeling Technique

Initialize cluster centroids.
Assign equal weights to all data points.
Compute initial maximum likelihood estimates of gamma parameters [1].
Choose K.

| Algorithm 1 Instance-Weighted Mixture Modeling Technique |
|---|
| Initialize objective function using Eq. 2.<br>while objective function increases do<br>   {E-Step:}<br>   Update posterior Q using Eq. 3.<br>   {M-Step:}<br>   Update cluster centroids using Eq. 9.<br>   Compute data distances from the nearest centroids. Update gamma parameters.<br>   Update weights of data points using Eq. 14.<br>end while |

C. Relation to Other Instance-Weighted Models

In the seminal formalization of instance-weighted algorithms, Nock and Nielson used constrained minimization of Bregman divergence to compute weights in a boosting framework. Their weight estimation module computes local variations of the expected complete log-likelihoods and increases the weights of those points on which the current parametrization does not do well. Our goal conflicts with this scheme as we do not want to increase the weights of outliers. On the contrary, our formulation resembles pseudo-relevance feedback technique used for document retrieval. Such approaches typically measure the Kullback-Leibler divergence between the document representations and the input query model and select a fixed number of most similar documents to update the query representation. In our case, all instances will variably influence the parameter estimation controlled by K. It also provides a principled alternative to empirical weight estimation based on counting the number of neighboring points.

D. Relation to Other Entropy Regularized EM Methods

Techniques such as entropy regularization are very fundamental and applied to many critical problems. A seminal use of such regularization is in deterministic annealing where entropy of conditional probabilities p(y|x) relating input x to cluster y is used to avoid hard clustering. Similar regularization is used in. Some approaches extend the regularized conditional probabilities to automatically determine the number of mixture components. Entropy regularization is also popularly used for feature-weighting. In these examples, data instances are uniformly weighted.

Entropy regularization fits naturally with instance-weighting and while the regularization looks superficially similar to the previously discussed techniques, it is fundamentally different. A typical data likelihood does not concern with variable weights and a typical objective function only optimizes mixture parameters. ARTEMIS's objective function is non-traditional as we aim to not only find optimal distribution parameters but also the weight distribution over sample points. Consequently, it deals with much larger number of variables. Instead of model parameters, instance-weights which represent properties of sample data, are constrained. Such regularization is more robust to noise and indirectly controls model parameters leading to a stable estimation. To the best of our knowledge, entropy regularized instance-weighting has not been theorized until very recently Also, no real applications have been presented.

IV. Analysis of Algorithm Behavior

We present the convergence analysis of instance-weighted mixture modeling in the appendix and find that each iteration concludes with the M-step identifying globally optimal mixture parameters and instance weights for that iteration. Indeed, same as any EM-type algorithm, the overall EM-algorithm here cannot guarantee global optimality. It is necessary to analyze clustering model selection i.e., selecting the correct number of clusters K and their initialization.

A common model selection technique is to run the algorithm several times with different number of clusters and different initializations before information criteria such as Akaike information criterion.

Bayesian information criterion, or their variants can be used to select the simplest model that reasonably explains the data. These criteria are particularly useful to ensure a non-parametric algorithm such as K-Means does not get stuck in local optima, however they are not designed for instance-weighted scenarios and their validity for the proposed algorithm is unknown. Nonetheless if ARTEMIS is run using different initializations, the resulting parameter estimates lead to similar information criteria values.

FIG. 3 relates to the simplified visualization in Section I and illustrates four separate random initializations with 20 clusters each, that lead to similar output. The converged solutions generate fairly consistent weight distributions. The robustness of the algorithm can be attributed to the indirect regularization of cluster parameters through varying instance weights. Each iteration computes a variable weight for each data point which in turn affects the prior of associated centroids. Therefore, outliers belonging to isolated data clusters will continue to lower in weights, subsequently weakening the contribution of the isolated cluster to overall likelihood.

In practice, curse of dimensionality may adversely affect the algorithm performance. However, it still maintains a reasonable level of robustness compared to unweighted clustering algorithms such as K-Means. We conducted a ranking experiment using the full feature set of 476 dimensions (described in Section VI), 977 training images, and 647 test images. We applied K-means clustering and the proposed instance-weighted mixture modeling algorithm to fifty different random initializations to learn respective statistical models. The evaluation was conducted by measuring average precision of ranking the 647 test images. We found that the mean average precision of K-Means was $0.553 \pm 0.018$ and that of instance-weighted mixture modeling was $0.738 \pm 0.005$. We also varied the number of components in mixture model estimation from 4 to 40, to find the mean average precision to be $0.735 \pm 0.007$. In other words, as long as the initialization is seeded with sufficient number of clusters, the mixture model-based algorithm is likely to be robust.

It is trivial to extend ARTEMIS to 'out-of-sample' data. The out-of-sample problem affects all algorithms based on the concept of manifold learning such as locality preserving projections and Eigen analysis. As the learned manifold is tuned to the training data, it is imperative to compute an extension operator that will extend the mapping to new and possibly out-of-sample points. The difference of HLM from such manifold learning methods is that the mapping is only hypothetical. The mixture likelihood of any instance can be computed using only its distance from the nearest centroid (in the original feature space). As the actual point-wise mapping to the hypothetical multivariate normal space can be bypassed, the extension operator is trivially available. Secondly, we expect the mixture models learned from different samples to generate consistent rankings under large sample conditions, leading to statistical generalization.

V. Artemis Framework

To setup an image annotation system using ARTEMIS framework requires three modules: (a) image collection and feature extraction, (b) ARTEMIS training data selection, and (c) annotation system training.

A. Image Collection and Feature Extraction

A standard text search engine is used to retrieve Flickr images labeled with each concept in the annotation vocabulary. We used three visual features: 73-dimensional edge direction histogram, 128 dimensional wavelet texture and 225-dimensional block-wise color moment features. Textual features were computed using Latent Dirichlet Allocation. The number of topics was set by analyzing 54,000 Flickr images from a benchmark dataset as follows. The benchmark images have ground-truth for 81 concepts that denotes the relevance of a concept to the image. We designed a classification task where the class of each image was denoted using the hexadecimal number equivalent of the 81-dimensional binary ground-truth vector.

Figure 4:
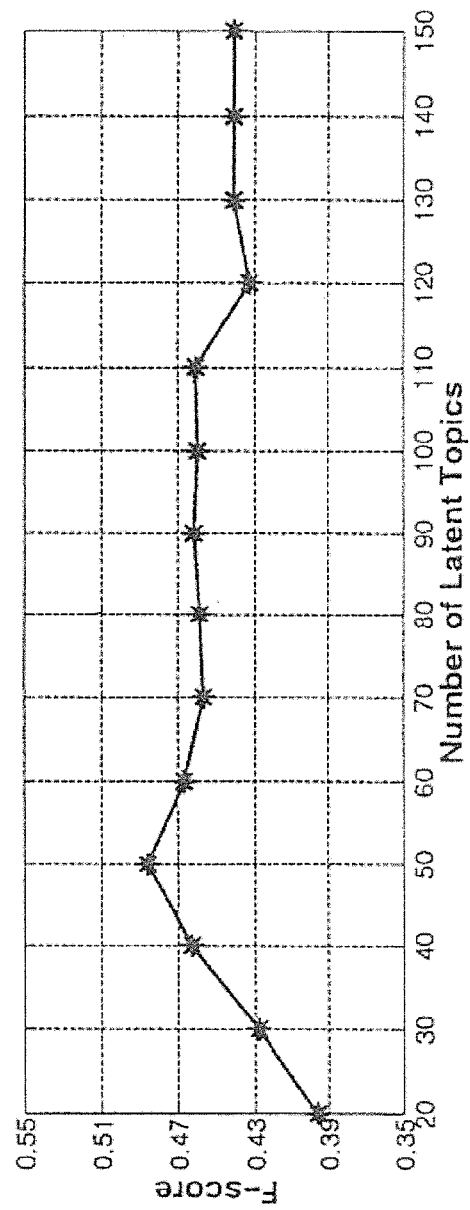
FIG. 4 illustrates determining the number of LDA topics for tag representation.
Figure 2A:
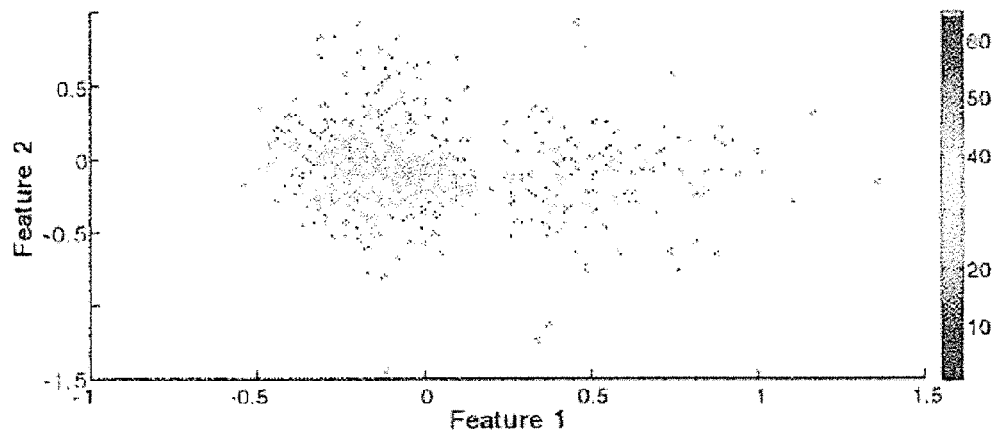
FIGS. 2A-2F show simplified heat-map visualizations of training data selection in 2-dimensional feature space (view in color). Each point is one of 647 user-tagged images associated with a common target concept. The color of each point can be mapped to a concept-specific numeric relevance score using the associated color scale (not normalized). The specific selection scenarios are as follows.
Figure 2B:
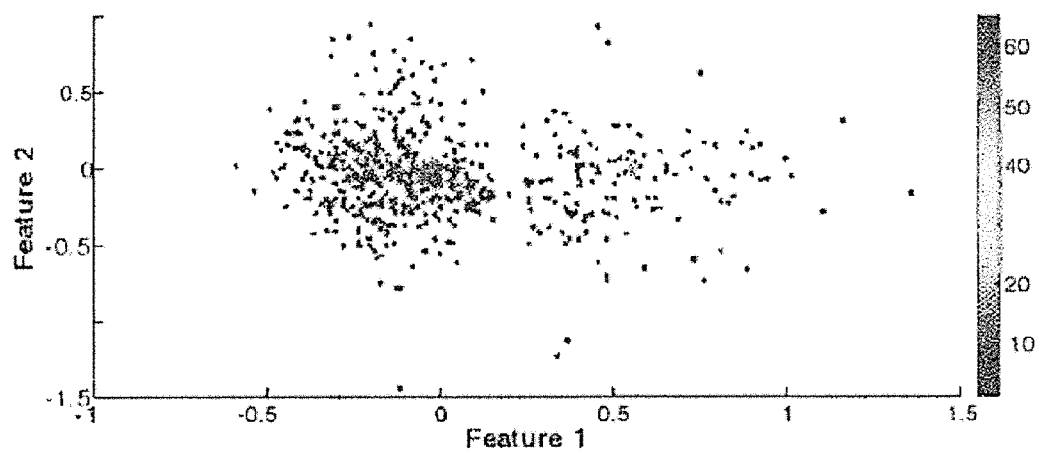
Figure 2C:
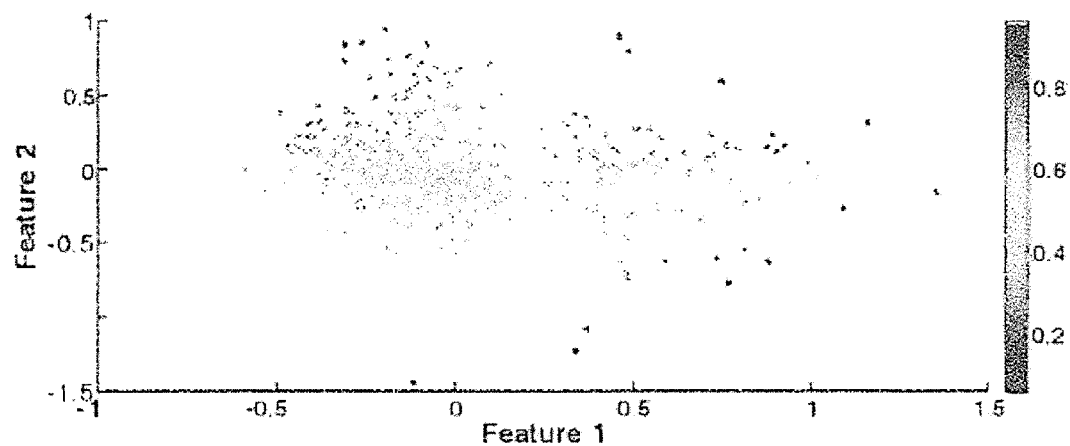
Figure 2D:
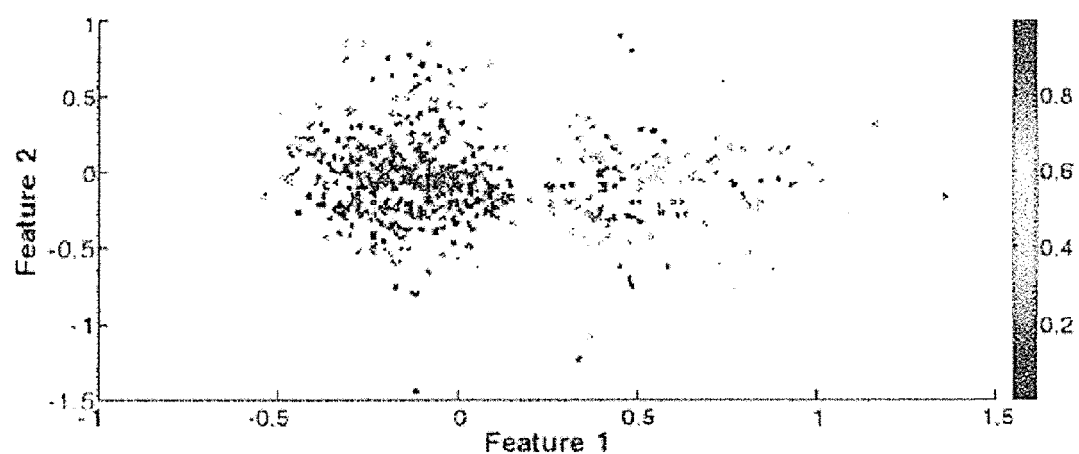
Figure 2E:
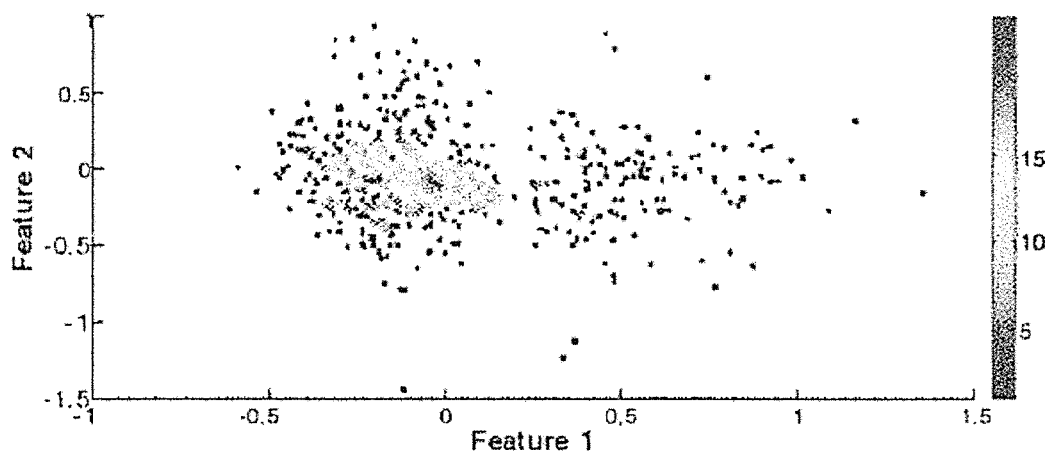
Figure 2F:
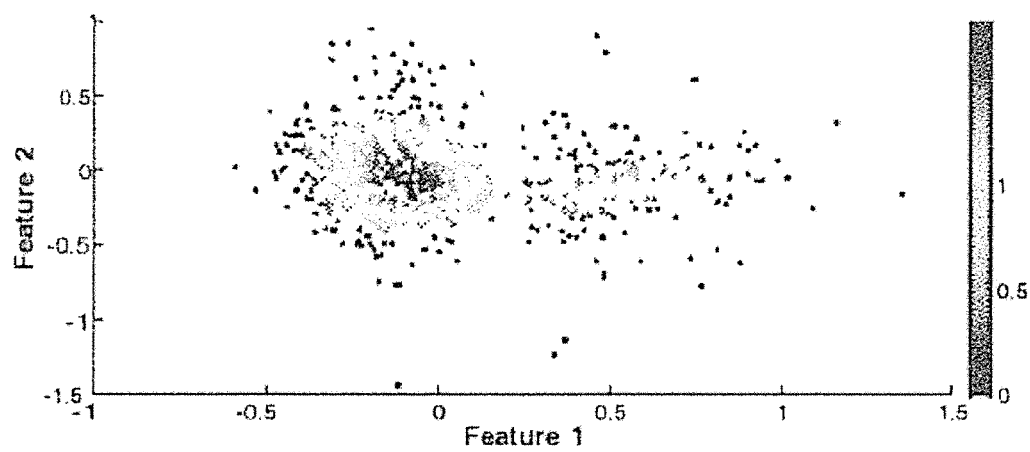
Figure 3A:
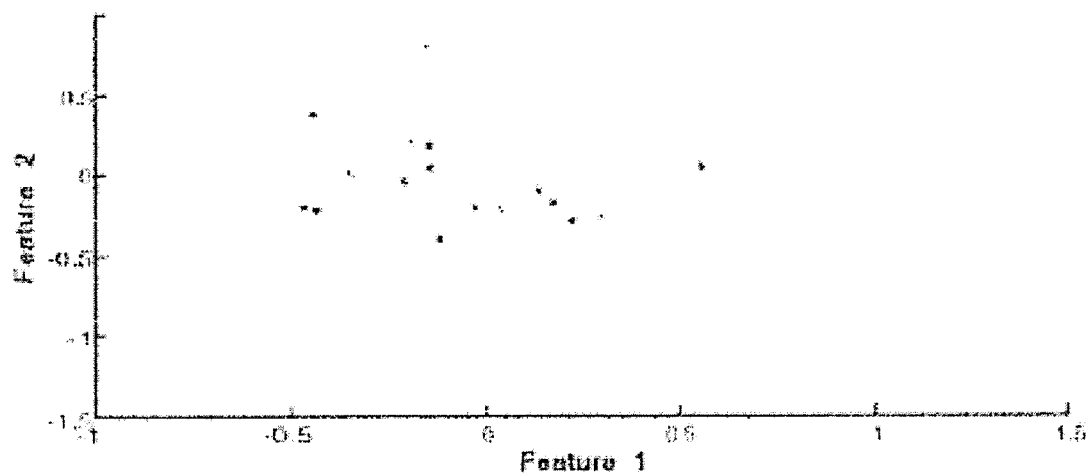
FIGS. 3A-3H reveal the robustness of the proposed algorithm using four different clustering initializations that converge to similar instance weight distributions.
Figure 3B:
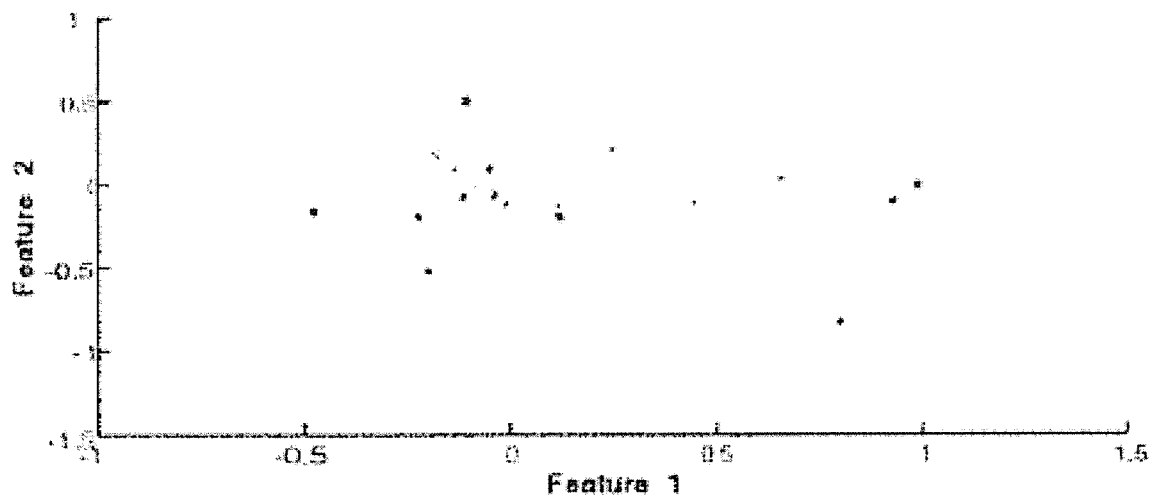
Figure 3C:
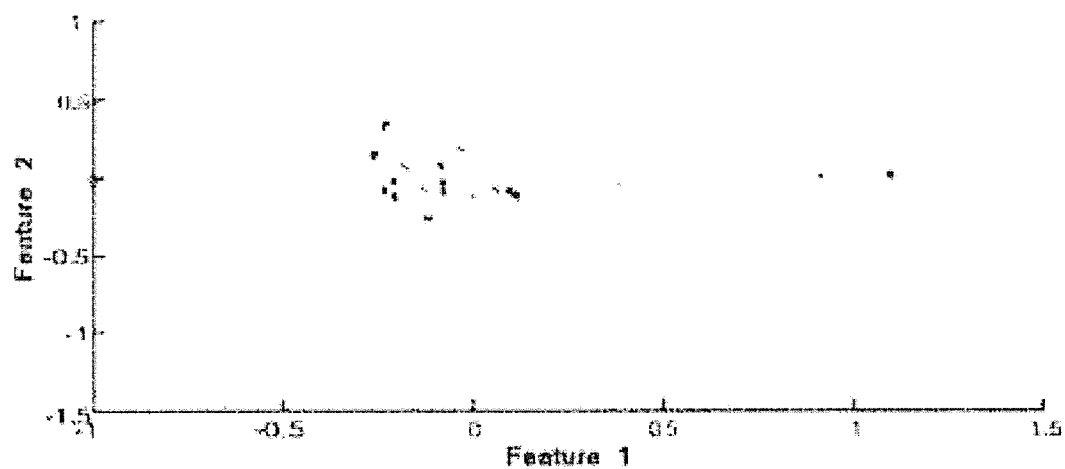
Figure 3D:
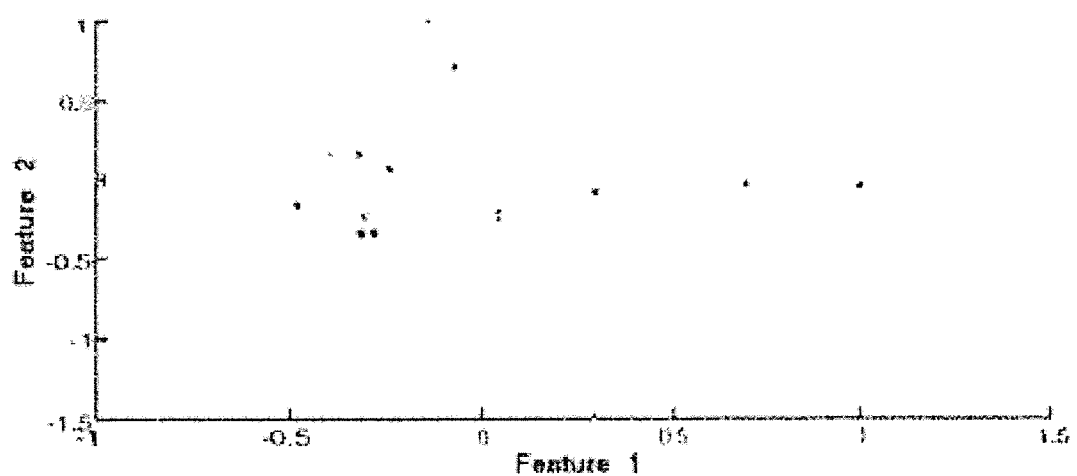
Figure 3E:
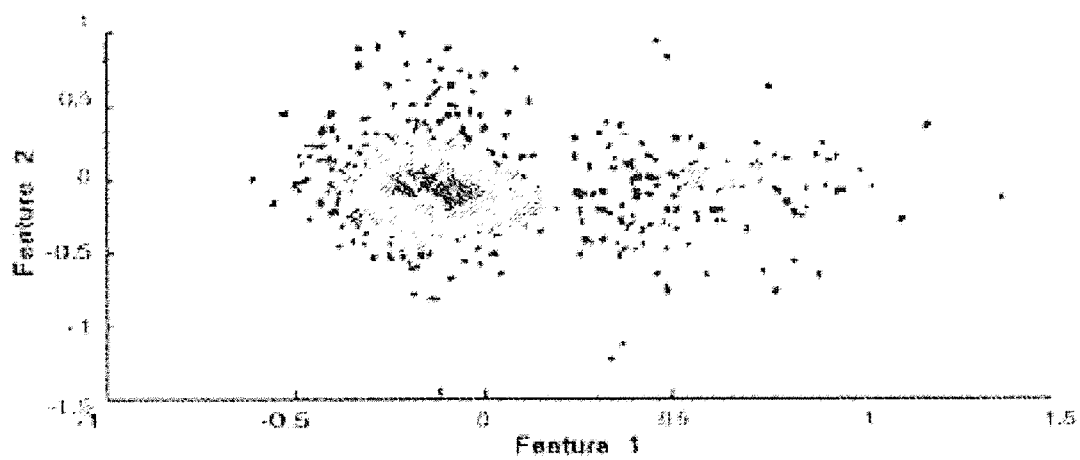
Figure 3F:
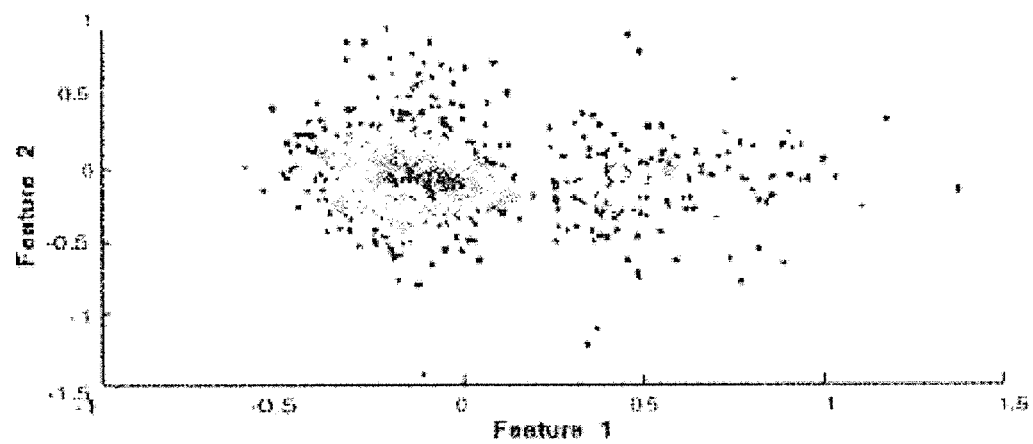
Figure 3G:
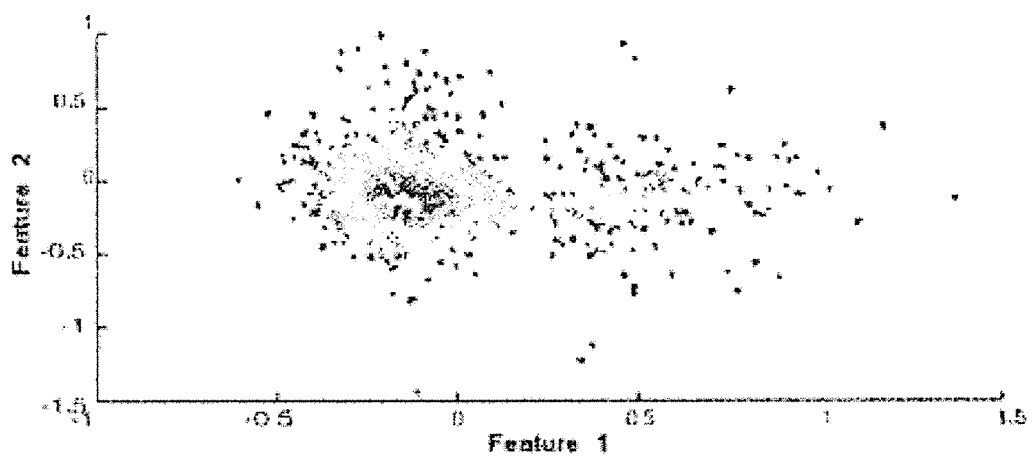
Figure 3H:
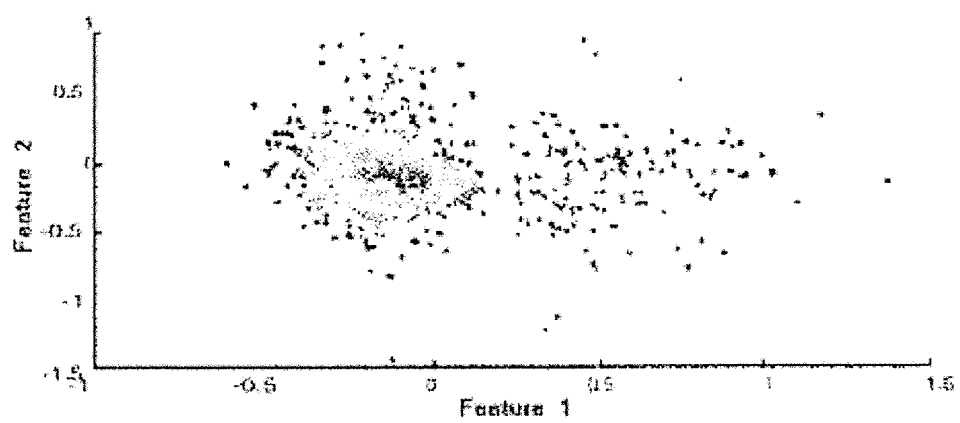

To overcome the sample insufficiency problem, classes associated with at least 5% of the samples were used. We then trained naive Bayes classifiers using topic model distribution as features. The performance was measured by varying the number of topics. FIG. 4 shows the cross-validation performance which peaks at 50 topics. Consequently, we computed textual features as a distribution of dimension 50. A fast LDA implementation based on Gibbs sampling was used for inference [3]. Tags were pre-processed using stemming and stop-word filtering.

B. ARTEMIS Training Data Selection

Figure 5:
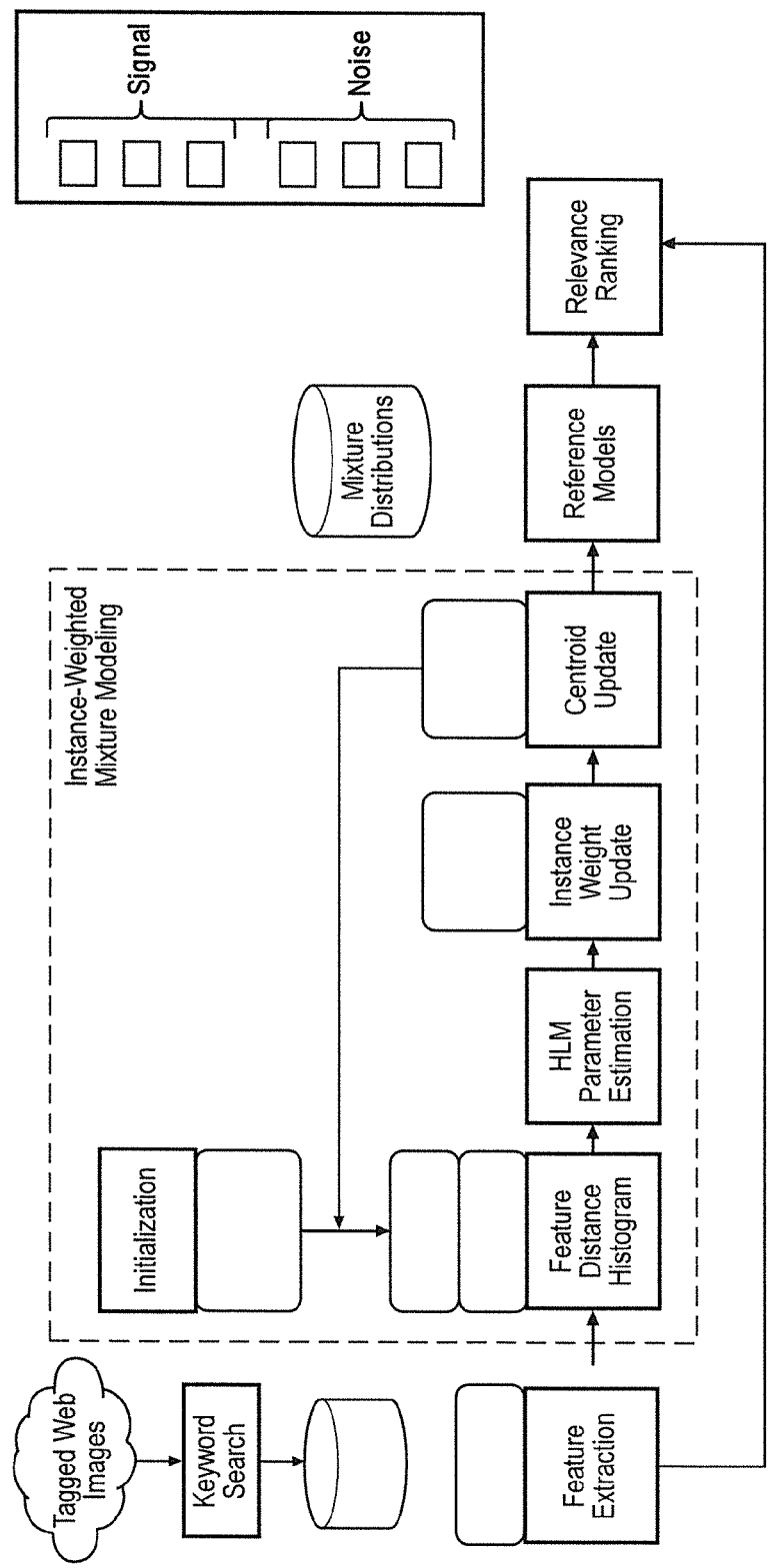
FIG. 5 illustrates computing a concept reference model from tagged images. Visual and textual features are extracted. Instance-weighted mixture modeling is used to learn a reference model by variably weighting the images. Candidate images with high likelihood are retained to train annotation systems.

FIG. 5 shows the flow of ARTEMIS framework which processes one concept at a time. The reference model for each concept is learned by applying the formulation in Section III to the visual and textual features of images retrieved by the search engine. Next, images (that may or may not be a part of the reference model training) are ranked in the decreasing order of likelihood. Training data for the target concept is selected as a pre-determined number of top-ranked images or using a likelihood-based threshold value. We explain our choice of using a fixed number of images in Section VI. Note that an image labeled with multiple tags is used in learning reference models of all those concepts. However, it will be weighted differently for different concepts. All concept reference models are stored in a database for future use.

C. Training an Annotation System

As ARTEMIS processes one concept at a time, it is most suitable for methods that work with a fixed vocabulary and model each concept individually. For instance, it would make sense to use ARTEMIS to select training data for annotation systems based on SVM classification or generative modeling as in ALIPR [2].

VI. Evaluation

ImageNet and COREL are two popular sources of manually verified and organized images, but do not provide original user tags. As automatic training data selection techniques are designed to directly operate on tagged images, ImageNet and COREL are inadequate for our scenario. Our experiments predominantly leverage the popular NUS-WIDE benchmark dataset having 269,648 Flickr photos split into 161,789 training images and 107,859 testing images with original tags. One thousand popular words that refer to generic objects, scenes, events, locations, actions, and their attribute are chosen as the annotation vocabulary of the desired large-scale image annotation system. NUS-WIDE dataset provides ground-truth labels for a total of 81 tags and only 75 of them are common with the designed vocabulary (listed in the appendix). Given the rarity of the six excluded tags, there is no statistically significant difference in the mean precision if all 81 benchmark tags were to be used in reporting experimental results[2].

[2] The excluded concepts are (number of training images in bracket): computer (305), map (211), swimmers (282), tattoo (284), whales (304) and elk (335). Thus the excluded six tags are used 1721 times collectively or 287 times on an average. On the other hand, the remaining 75 tags appear 138,789 times collectively or 1851 times on an average.

As a comprehensive evaluation of ARTEMIS for large-scale applications is resource-intensive, we divide the experiments into two groups that provide a trade-off between the benchmark ground-truth and manual assessment.

The first group of experiments is designed to compare several automatic training data selection approaches. Performance is measured in a fully automatic fashion using the ground-truth of 75 benchmark concepts. The performance of each concept is measured independently and is not affected by the performance over other words in the vocabulary or the vocabulary size (whether 75 or 1000). Three facets are considered.
1) Accuracy: We expect ARTEMIS to rank typical images higher. We explore this in Section VI-A.
2) Coverage: The performance on unseen and incompletely tagged images is explored in Section VI-B.
3) Modeling considerations: In Section VI-C, we analyze the feature combination, the choice of K, and scalability of the proposed algorithm.

Section VI-D presents a controlled annotation experiment considering only the 75 word vocabulary, also evaluated automatically using the ground-truth information. The purpose of these experiments is to establish a preference for ARTEMIS among all automatic training data selection approaches. The annotation experiment shows that ARTEMIS-driven annotation system is second only to the manual training image selection.

The second group of experiments is driven by the general expectation that the utility of automatic training data selection can be sufficiently proved if its performance is comparable to manual selection. In Section VI-E, we compare the 1000-word image annotation systems trained using ARTEMIS with those trained using ImageNet and COREL by manually checking the validity of proposed annotations. We do not repeat the other automatic training data selection baselines due to the labor-intensive nature of manual assessment and because the earlier experiments already established a preference for ARTEMIS. The strategy to increase the scope in terms of the number of concepts and to narrow the focus in terms of the number of baselines allowed us to complete the evaluation in 320 man-hours per reviewer.

Figure 6A:
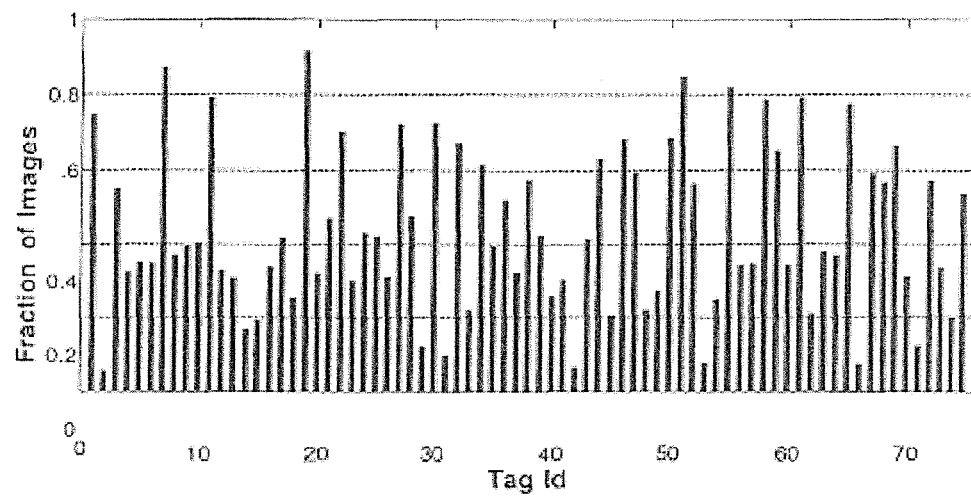
FIGS. 6A-6B show tagging characteristics of benchmark concepts of the challenging nature of the NUS-WIDE dataset.
Figure 6B:
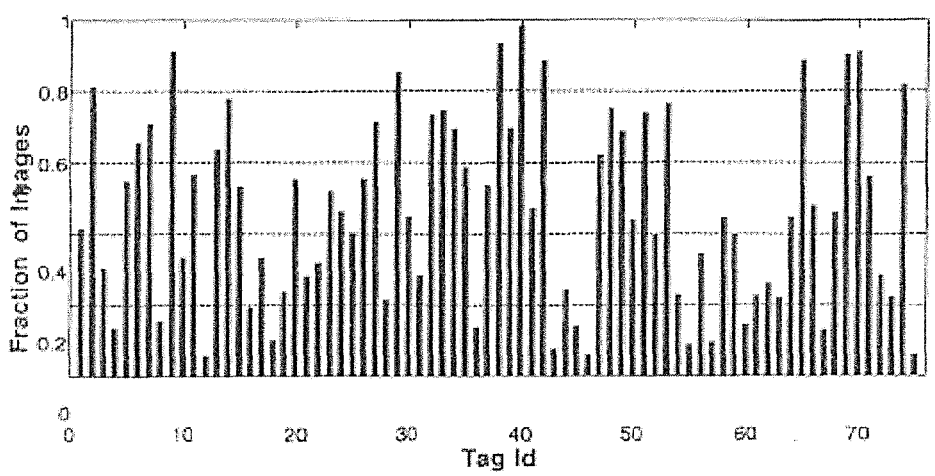

To study the noisy nature of tagged images using the NUS-WIDE dataset, we recorded three numbers for each of the 75 tags: (a) the number U of images labeled by users using the tag, (b) the number G of images where the ground-truth assessment indicates that the tag should be relevant, and (c) The number C of images that are correctly tagged i.e., an intersection of collections in (a) and (b). Then for a concept, the fraction of inaccurately tagged images is computed as $(U-C)/U$. The fraction of incompletely tagged images is computed as $(G-C)/G$. FIG. 6 shows the concept-wise plots of incorrectly or incompletely tagged image fractions. The overall percentage of incorrectly tagged images is 43.9% and that of incompletely tagged images is 46.8%.

The number of images for each benchmark tag in the dataset ranges from a few hundred to many thousands. Also, the percentage of noisy images in different concepts varies. In the context of ARTEMIS, it is trivial to incorporate a training data selection strategy that filters out all images with likelihood values lower than a prescribed threshold. However different baselines generate arbitrary ranges of scores and a fixed number of images need to be selected for fair comparison. To account for the limited number of images in the NUS-WIDE dataset, we used a liberal 50% of top-scoring images to ensure sufficient training data for even low frequency concepts. The performance is quantified using mean average precision (MAP), precision (P) and recall (R) of the ranked subset.

Baselines:

Our experiments focus on a set of representative public-domain baselines. We also implemented an instance-weighted version of the K-Means algorithm.

'UserTag': Non-algorithmic baseline using original tags to select training images without any human verification.

'KMKC': K-means clustering initialized with the K-center strategy. Images are selected in the order of increasing distance from the nearest prototype.

'IW-KMKC': An instance-weighted version of the K-means clustering initialized with the K-center strategy. Within each iteration, the weight of a data point is updated in proportion to a regularized function of its distance from the nearest centroid. When the algorithm converges, training images are selected in the decreasing order of weighted proximity from the nearest centroid.

'SVM': A LIBSVM classifier for each concept that scores images using the classification margin. The regularization cost parameter was empirically set.

'SVMRank': Joachims' implementation of ranking SVMs with pair-wise constraints that force positive class examples to have a high score compared to each negative class example. Training examples are determined using the ranking score. The cost parameter was empirically set.

'OCSVM': A LIBSVM implementation of one-class SVM with the noise parameter set to 0.5. The learned hypersphere contains about 50% of the training instances as signal and classifies the remaining as noise.

'TagProp': A large body of recent tag refinement approaches are not public-domain or easy to implement with the same mathematical precision and experimental rigor as their developers. Consequently, we used TagProp, a K-nearest neighbor-based technique that is representative, public-domain, and ensures fair application to all experimental settings. Training examples are selected to be those images whose refined tag descriptions contain the target concept. We also experimented with another, more recent technique based on sophisticated graph embedding and label correlation. However, this resource-heavy approach could process only about 5% of the training data at a time (the original paper uses 345 dimensional features and processes 10,000 images at a time). Further, the label correlation is computed specific to the selected vocabulary and any incorporation of novel concepts requires re-learning of the visual embedding from scratch. Therefore, we did not select this approach over TagProp. Section VI-A also presents a limited comparison with the approaches by Zhu et al.

In the context of training data selection, SVM and KMKC clustering are the most widely used alternatives. To the best of our knowledge, no instance-weighted algorithms, including IW-KMKC, have been applied to the training data selection problem, yet it is included as a link between K-Means and ARTEMIS. For SVM and SVMRank, negative examples are selected from images not labeled with the target tags. The SVMRank algorithm presents a proxy to the PAMIR system as their performance on single-word queries is similar. However, due to its quadratic complexity, SVMRank is expected to be slower. ARTEMIS is compared with manual selection alternatives in Section VI-D and in VI-E.

A. Accuracy of Training Data Selection

Table I shows the data selection performance on the training and the testing partition of the NUS-WIDE dataset. Results on the training partition are important in practice, because the set of images used in reference model learning will also be ranked to complete training data selection. A consistent performance on the testing partition shows generalization to novel images. ARTEMIS reference models generate the best ranking with a MAP value of 0.47 and precision of 0.62. The next best baselines IW-KMKC, KMKC, and OCSVM achieve considerably lower MAP values.

TABLE I

PERFORMANCE OF TRAINING DATA SELECTION ON THE TRAINING AND TESTING PARTITION OF NUS-WIDE DATASET

| Algorithm | Training | | | Testing | | |
| --- | --- | --- | --- | --- | --- | --- |
| | P | R | MAP | P | R | MAP |
| ARTEMIS | 0.628 | 0.309 | 0.474 | 0.623 | 0.306 | 0.468 |
| IW-KMKC | 0.603 | 0.293 | 0.427 | 0.594 | 0.291 | 0.421 |
| KMKC | 0.587 | 0.278 | 0.409 | 0.579 | 0.283 | 0.412 |
| SVMRank | 0.580 | 0.276 | 0.392 | 0.572 | 0.271 | 0.382 |
| SVM | 0.574 | 0.274 | 0.376 | 0.571 | 0.272 | 0.374 |
| OCSVM | 0.595 | 0.302 | 0.409 | 0.607 | 0.297 | 0.396 |
| TagProp | 0.561 | 0.265 | 0.369 | 0.563 | 0.271 | 0.388 |
| UserTag | 0.467 | 0.224 | 0.278 | 0.464 | 0.225 | 0.275 |

Figure 7A:
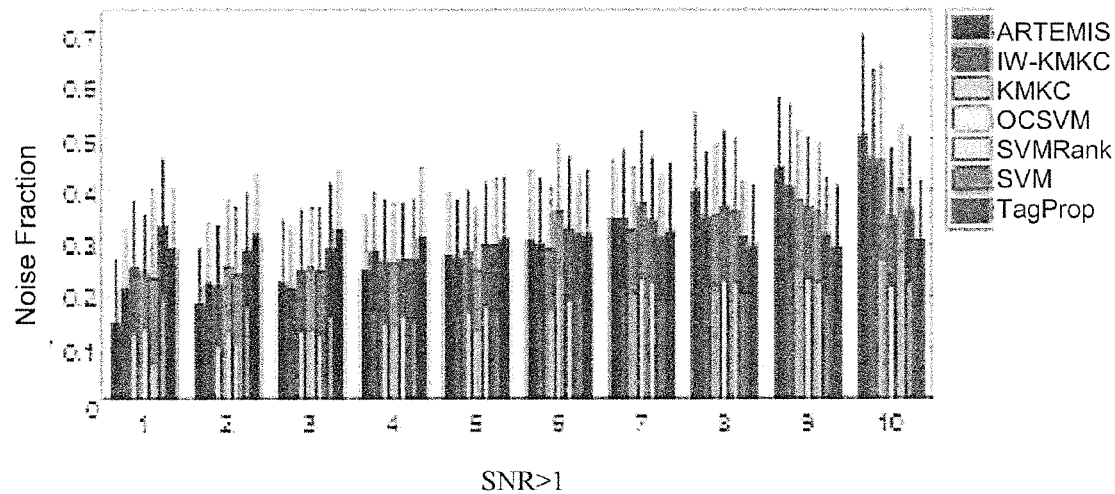
FIGS. 7A-7B depict the ratio of inaccurate images (noise fraction) in ten consecutive segments of ranked lists shows an increasing trend. This indicates the desired aggregation of relevant images at the top of ranked lists. The trend is more prominent for concepts with SNR>1.
Figure 7B:
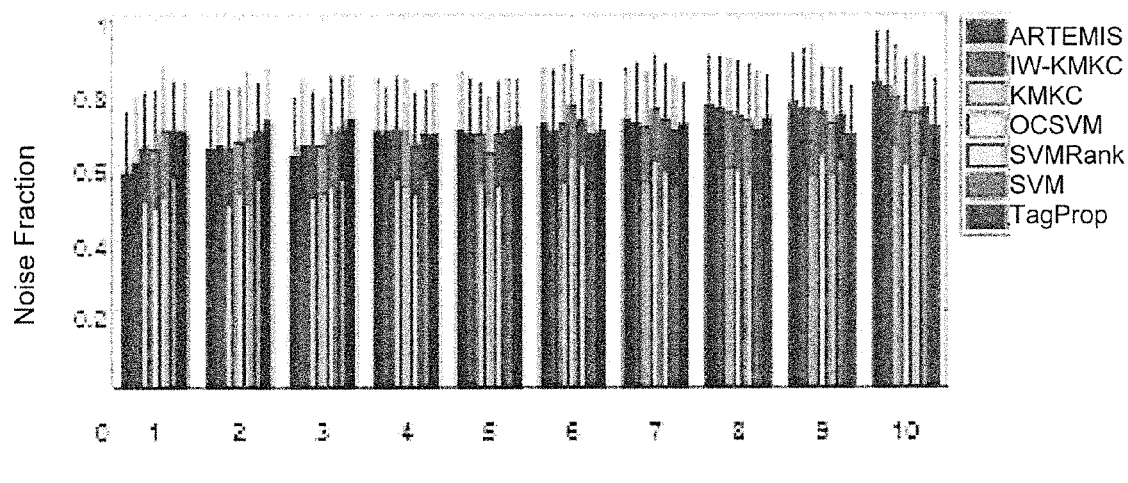

Ranking is further analyzed by segmenting the ranked lists of each benchmark concept into ten parts and measuring the fraction of inaccurate images in each segment (10% of images). The original noise level for each concept is measured as a ratio of the number of correct images to that of incorrect images using the ground-truth. This is essentially the signal to noise ratio or SNR. SNR of 1.64 for the concept tiger means that out of 264 images, 100 images are irrelevant and 164 images are relevant. In this case, the overall noise fraction is 0.38 and each of the ten segments is expected to contain 0.038 of the noise fraction if distributed uniformly. When ARTEMIS is used to rank the images, the first segment contains 0 noisy examples and the last segment contains about 0.22 noise fraction. This supports the idea that top-ranked images represent good training examples. We note that the ranking performance degrades for concepts with very low SNR values e.g., the concept earthquake where the number of noisy images is about nine times the number of relevant images. Overall 63% of benchmark concepts have SNR greater than or equal to one. The charts of FIGS. 7A and 7B show the mean and standard deviation of the noise fractions across all segments, computed separately for concepts with SNR>1 and SNR≤1. The increasing trend reflects accumulation of good images in the first few segments. The UserTag baseline is expected to produce a near-uniform noise distribution in all segments and not plotted for brevity. For concepts with SNR>1, ARTEMIS has a steeper noise fraction curve that starts as low as 0.15 for the first segment and ends in 0.51 for the last segment. For concepts with SNR≤1, the improvement is not as marked. FIG. 8 shows the examples of most relevant images for a few concepts.

A number of tag refinement studies have been evaluated on the NUS-WIDE dataset. Of these, Zhu et al. treated the refinement problem as that of matrix rank minimization where a matrix was constructed using the correlation between image features and tags. They used the same visual features as ARTEMIS. Since tag refinement includes a binary decision on relevance, we thresholded the likelihood-based image ranking with respect to each concept to determine if the concept should appear in the image's refined description. The threshold was selected to maximize the F-score of tag refinement on training partition. Using the same set of benchmark concepts and testing partition, the F-score of ARTEMIS 0.396 compares favorably with the F-score of 0.353 of Zhu's approach. The F-score of some concepts is as follows: horses (0.74), sky (0.65), bear (0.62), and statue (0.05).

B. Coverage of Training Data Selection

Figure 9A:
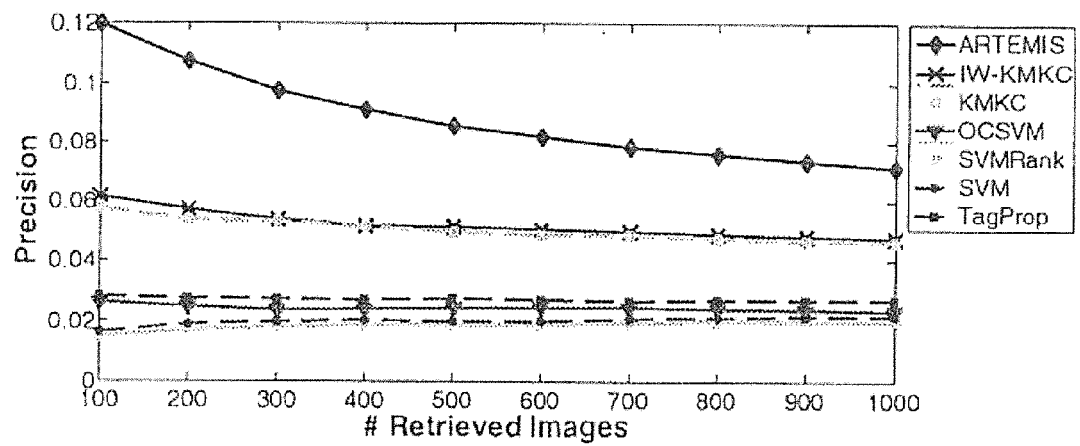
FIGS. 9A-9B illustrate performance on incompletely tagged images that ARTEMIS may identify as relevant images even when they are not specifically tagged.
Figure 9B:
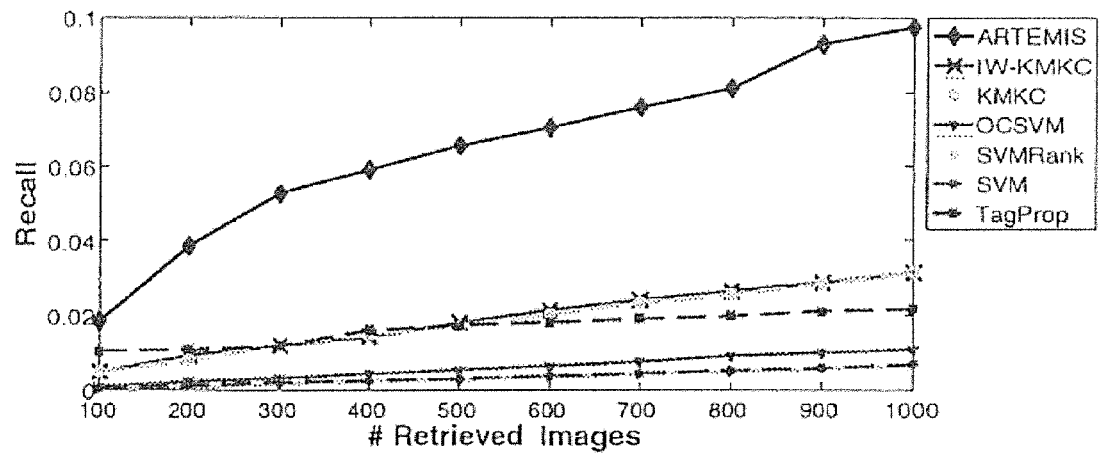

We next evaluated the performance with tag incompleteness, i.e., when the target concept is missing from image tags. UserTag baseline could not retrieve such images, however other systems were applicable if textual features generate similar topic distributions. The entire testing partition disregarding the images labeled with the target concept was ranked and assessed using ground-truth on missing labels. FIGS. 9A-9B show the performance of selecting a fixed number of most likely images for each target tag. ARTEMIS achieved 12% precision in the top 100 images. In the top 1000 images, the precision reduced to 7.2% however 9.7% of incompletely tagged images were correctly recovered. The performance of other baselines was sub-optimal in comparison.

TABLE II

PERFORMANCE OF INDIVIDUAL FEATURES IN WEIGHTED EM

| Feature | P | R | MAP |
|---|---|---|---|
| Edge | 0.572 | 0.271 | 0.405 |
| Wavelet | 0.571 | 0.283 | 0.406 |
| Color moment | 0.578 | 0.272 | 0.409 |
| Words-LDA | 0.592 | 0.296 | 0.442 |
| SIFT | 0.593 | 0.286 | 0.412 |

C. Modeling Considerations

We now illustrate (a) the feature combination, (b) the effect of regularization factor K, and (c) scalability.

1) Feature Combination:

Table II shows the ranking ability of individual features with the LDA-based tag representation having the highest MAP performance. Referring to Table I, the performance of feature combination improved on individual features. The SIFT experiment was conducted at a later stage at the suggestion of a reviewer by leveraging the 500-dimensional bag of SIFT features available in the NUS-WIDE dataset. When SIFT was combined with the remaining four features, the performance somewhat dropped to 0.571 (P), 0.275 (R), and 0.381 (MAP), possibly due to the curse of dimensionality for the low-frequency concepts in the NUS-WIDE dataset. Consequently, we did not further incorporate SIFT features in our system.

Figure 10:
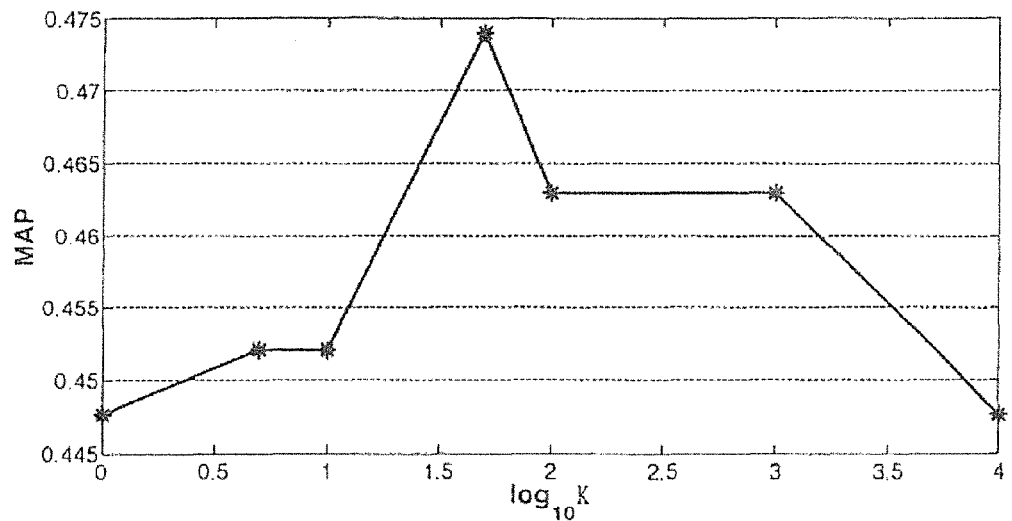
FIG. 10 depicts the effect of varying the regularization factor κ, indicating the advantages of instance-weighted learning over unweighted mixture modeling.

2) Effect of Weight Regularization Parameter:

The regularization factor K is the only tunable parameter in ARTEMIS to control the shape of instance weight distribution. Whenever the ground-truth is available, the value of K may be selected using cross-validation. However in real-world scenarios and especially for a large concept vocabulary, we cannot expect to know the ground-truth in advance. In that case, a purely heuristic approach may be taken. We repeated the ranking task with different values of K: 1, 5, 10, 50, 100, 1000, and 10000. FIG. 10 plots $\log_{10}$ (K) versus MAP value. The performance initially increases, peaks at K=50, and then drops as weights are forced towards a uniform distribution. Note that the abrupt slope change of performance curve is a result of testing few K values in a logarithmic scale. The performance in fact would smoothly vary over a small continuous neighborhood. The K plot can be used in the same spirit as the grid-search based parameter estimation of SVM.

3) Scalability:

Due to its analytical optimization framework, the computational complexity of the proposed method is comparable to that of the traditional K-Means algorithm. If N denotes the number of training examples and J the average number of mixture components per reference mode 1, each iteration of weighted-EM requires O (NJ) computations where J<<N. We limit J to at most 20, whereas N ranges in the order of many hundreds to a few thousand images per concept. The performance is measured on a single Intel processor with 2.66 GHz speed and 24.4 GB memory. To load, cluster and rank 10,000 images with pre-computed features takes 32.5 seconds with a C implementation. To process 100,000 images takes 126.76 seconds—a significant speed-up over manual data collection or SVMRank.

The time cost of clustering-based baselines (ARTEMIS, IW-KMKC, and KMKC) is linear in the number of data points and in the number of clusters. The overall training data selection time for 75 benchmark concepts using clustering-based methods ranged between 10 to 15 minutes. As TagProp uses pair-wise distances to find visual neighbors, the time cost scales quadratically with the number of data points. The training data selection using TagProp took slightly over 11 hours. The SVM implementation is super-linear in the number of data points with a time cost of 1 hour 10 minutes. The time taken to train OCSVM was about 3 hours. Finally SVMRank scales quadratically in the number of constraints as it attempts to minimize the number of pairs of training examples that are swapped with respect to their positive or negative class labels. This was the slowest baseline and took 13 days and 9 hours for training data selection. The above time costs do not include feature extraction time because we used pre-computed features from the NUS-WIDE dataset.

TABLE III

COMPARISON OF 75-WORD IMAGE ANNOTATION SYSTEMS
TRAINED WITH DIFFERENT DATA SELECTION METHODS

| Scheme | Mean P | Mean R |
|---|---|---|
| ARTEMIS | 0.029 | 0.960 |
| IW-KMKC | 0.027 | 0.920 |
| KMKC | 0.025 | 0.900 |
| SVMRank | 0.026 | 0.897 |
| SVM | 0.024 | 0.892 |
| OCSVM | 0.028 | 0.904 |
| TagProp | 0.024 | 0.890 |
| UserTag | 0.022 | 0.894 |
| Manual | 0.036 | 0.973 |

D. Automatic Versus Manual Data Selection

Broadly, there are three ways to use tagged images to train image annotation systems. Either all tagged images may be used without any selection criterion, or a subset of images may be selected after automatically or manually verifying their relevance. In this section, we present a controlled experiment to support two claims: i) Automatic and manual selection are better than no selection at all, and ii) Of all the automatic selection techniques, ARTEMIS-driven image annotation system has the best performance.

All baselines are tasked with selecting training data from the NUS-WIDE training partition for a controlled vocabulary of 75 benchmark tags. The 'Manual' baseline is computed using the ground-truth labels. A common image annotation system ALIPR is trained using all baselines. ALIPR is a statistical modeling technique that models a concept using mixture models of color and texture discrete distribution features [2]. A test image is annotated by visual feature extraction and concept likelihood computation, both in real time. Ten top likely words are used to annotate the test image. In this experiment, the test images were selected from the NUS-WIDE testing partition and automatically evaluated using the corresponding ground-truth. Table III shows that next to 'Manual' baseline, ARTEMIS is the best performing method. The overall low precision and high recall of annotation is attributed to forcing ten predictions from a small vocabulary.

E. Training Real-World Image Annotation Systems

In this section, we establish ARTEMIS as a viable training data selection approach for large-scale applications. The annotation system with 1000 words is trained by selecting training data independently for each of the 1000 concepts corresponding to the 1000 words. That is to emphasize that even though the previous evaluation focuses on 75 benchmark tags, the training data selection itself is not limited to 75 tags. When 1000 words are considered, the usability of ARTEMIS can ideally be established in one of two ways.

The NUS-WIDE dataset has ground-truth labels for 75 concepts in the chosen vocabulary. The evaluation of training data selection can be extended by generating the label ground-truth for the remaining concepts. However, this is a prohibitively expensive task. For instance, the reported effort in the generation of the ground-truth of 81 tags is 3000 man-hours. To generate the ground-truth for remaining concepts, it would take approximately 34000 man-hours.

The second approach is to manually check the annotations generated by a system trained with the data selected by ARTEMIS. Comparison with other baselines can be made by similarly training different versions of the same annotation system, each with the training data selected by one baseline. As our experiments involve eight automatic training data selection algorithms and two additional sources of manually curated data—ImageNet and COREL, it would be a hugely laborious effort to complete this task. For instance, to manually inspect the top ten annotations assigned to 4000 images, it would take about 800 man-hours per reviewer. Given the subjectivity of manual review, we used two reviewers to evaluate the relevancy of an annotation and a third review to break the tie in case of a disagreement between the two reviewers.

Given the huge amount of manual participation, it is difficult to rigorously quantify the performance on 1000 concepts. Consequently, we use the conclusion of the earlier experiments to select ARTEMIS as the preferred automatic training data selection approach. In this section, we compare the 1000-word image annotation systems trained using ARTEMIS with those trained using manually curated datasets such as ImageNet and COREL. We do not re-evaluate the other automatic training data selection baselines, thereby reducing the evaluation time to 320 man-hours per reviewer.

One limitation of this setting is that because the preference for ARTEMIS is not determined using all 1000 concepts, it is possible that the selected training data is not necessarily optimal for all 1000 words, but optimal only for 75 concepts. Indeed the initial experiments sufficiently prove only that the other automatic training data selection methods are not as effective as ARTEMIS within the controlled setting. However, this approximation is necessary to reasonably scope the large-scale evaluation. This idea of using the results on a small set of benchmark concepts as an indicator of the results in large-scale applications is a fairly common approximation used by several research works, many of them very recent. Because Section VI-A, VI-B, and VI-C measure the performance independently for each concept, the performance over one concept is not affected by the concept vocabulary size or the performance over other concepts.

We use the semantic modeling framework of ALIPR image annotation to conduct the main experiment where only the input training images are chosen from different sources.

ALIPR: This is the original ALIPR semantic modeling framework trained using 60,000 COREL images, organized into 599 categories and described using 332 words. The annotations of test images are generated by directly querying the system at http://alipr.com/.

ALIPR-I: ALIPR-I is the ALIPR semantic modeling framework trained using images from the ImageNet dataset. The 'I' in the title is a reference to ImageNet. The training images for each concept are collected by querying the ImageNet API at http://www.image-net.org/. If a query matched multiple synsets, up to five popular synsets were incorporated in the training data. If a query did not match any synset, it was dropped from the ALIPR-I vocabulary.

ALIPR-S: is the ALIPR semantic modeling framework trained using ARTEMIS-selected training images from the NUS-WIDE dataset. It is possible to augment the collection by crawling more Web images in the future and applying ARTEMIS. The 'S' in the title is a reference to social tagging.

The annotation performance was measured by manually inspecting the top ten annotations assigned to 4000 images: (a) 2000 random images from the NUS-WIDE testing partition, and (b) 2000 independent Flickr images. The different measures collected were: a) the mean precision in top ten annotations; b) the annotation diversity; c) the percentage of images correctly annotated by the $n^{th}$ word (n=1, . . . , 10) and, d) the percentage of images correctly annotated by at least one of the top n words. We also conducted a supplementary assessment of annotation precision and recall over 33 benchmark concepts shared by all annotation systems. Note that the assessments are also approximate given that the systems have annotation vocabularies of different sizes. This limitation arises from the practical constraint of extracting comparable training data from limited dataset resources. For example, COREL dataset uses a total of only 332 words, some of them missing from the ImageNet dataset.

Figure 11:
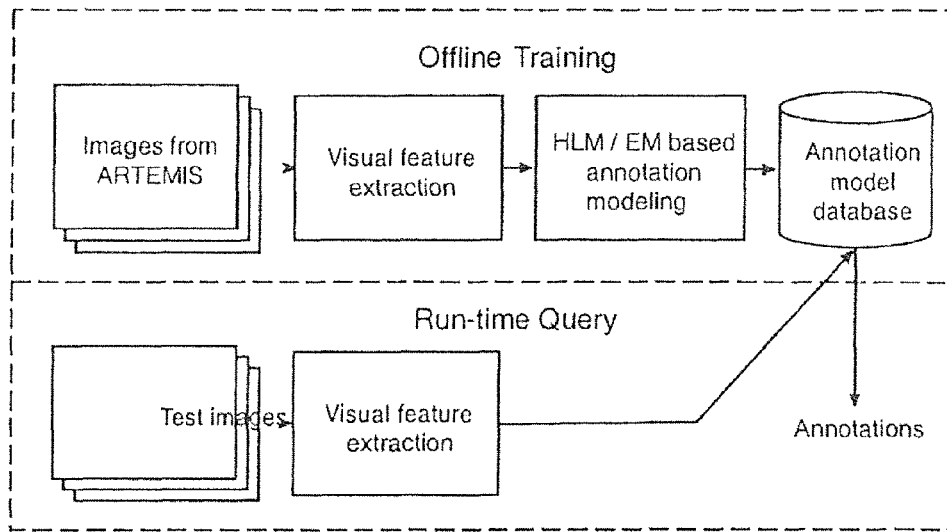
FIG. 11 presents the A-ARTEMIS annotation system which uses the instance-weighted learning approach for training data selection as well as semantic modeling of concepts.

ALIPR, ALIPR-I, and ALIPR-S are useful to separate the effect of training data selection from the sophistication of the annotation system itself. However, with the same training data, different annotation systems can yield different results. For illustration purposes only, we developed another image annotation system based on different visual features and a semantic modeling framework. We term this system as A-ARTEMIS—Annotation by ARTEMIS where the semantic modeling framework also uses the instance-weighted mixture modeling technique as shown in FIG. 11. The visual features used for annotation are edge direction histogram, wavelet texture, and block-wise color moment (EWCm). A-ARTEMIS should strictly be compared with only ALIPR-S for an insight into how different annotation systems could leverage the selected training data differently. Table IV records the features of all the image annotation systems. A-ARTEMIS appears to be slower due to more complex feature extraction at run-time.

TABLE IV

SET UP OF LARGE-SCALE IMAGE ANNOTATION SCHEMES

| Facets | ALIPR | ALIPR-I | ALIPR-S | A-ARTEMIS |
|---|---|---|---|---|
| Training data | COREL | ImageNet | ARTEMIS | ARTEMIS |
| Features | D2 | D2 | D2 | EWCm |
| Vocabulary | 332 | 830 | 1000 | 1000 |
| Time (seconds) | 1.4 | 2.3 | 2.9 | 63 |

From Table V, we find that ALIPR-S compares favorably with ALIPR-I and ALIPR-C for a general vocabulary. The benchmark performance is an under-estimation because only the ground-truth concepts can be evaluated. The higher recall of ALIPR may be partially attributed to the frequent use of generic words.

TABLE V

LARGE-SCALE ANNOTATION PERFORMANCE USING A) BENCHMARK ASSESSMENT, AND B) MANUALLY VERIFIED ANNOTATIONS

| | Benchmark | | Manual | |
|---|---|---|---|---|
| System | P | R | P (NUS-WIDE) | P (Flickr) |
| ALIPR | 0.072 | 0.179 | 0.218 | 0.215 |
| ALIPR-1 | 0.093 | 0.080 | 0.204 | 0.213 |
| ALIPR-S | 0.090 | 0.103 | 0.243 | 0.221 |
| A-ARTEMIS | 0.107 | 0.094 | 0.265 | 0.242 |

Figure 12:
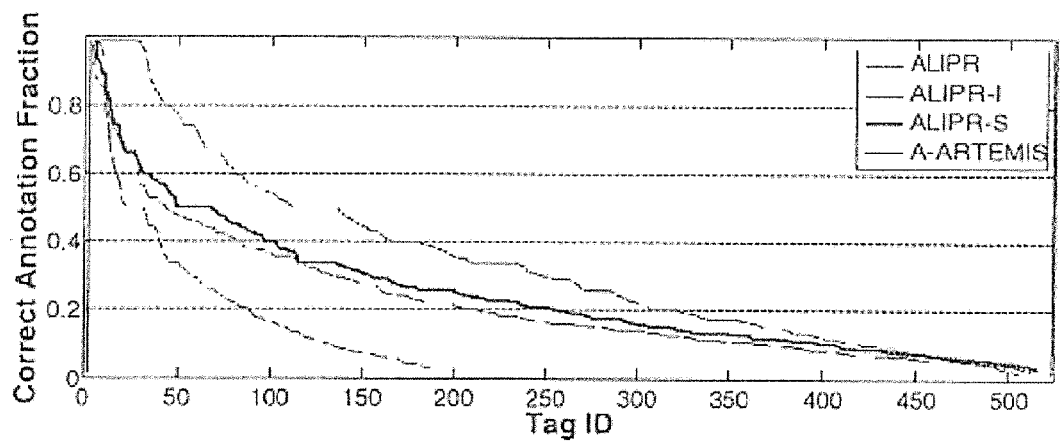
FIG. 12 shows a fraction of correct annotations by different words in the vocabulary shows diversity of annotation offered by A-ARTEMIS and ALIPR-S.

In the manual evaluation of top ten annotations, only 187 words of the 332-word ALIPR vocabulary resulted in at least one correct prediction. For ALIPR-I, ALIPR-S, and A-ARTEMIS the number of words with at least one correct prediction are 548, 508, and 518, respectively. FIG. 12 shows the fraction of correct annotations by a word in the vocabulary, sorted in the descending order for each scheme. The area under a curve is indicative of annotation correctness and diversity.

Figure 13A:
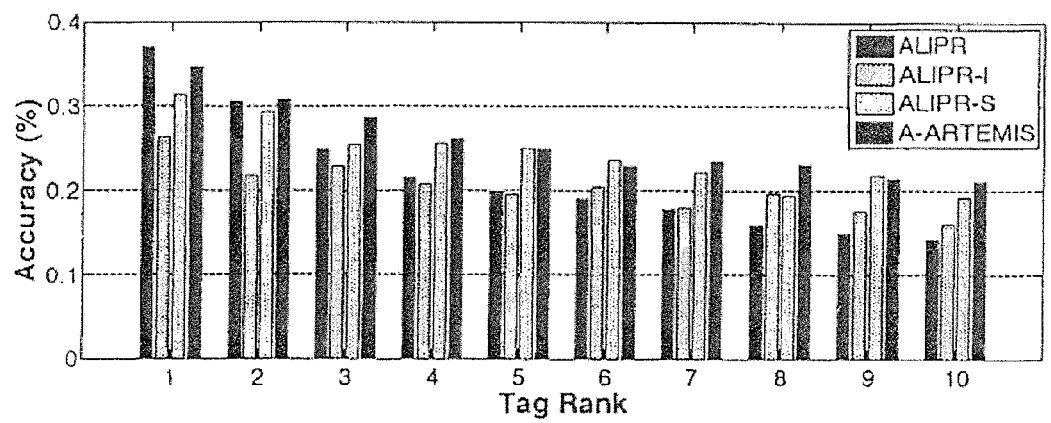
FIGS. 13A-13B illustrate performance based on manual evaluation; in particular.
Figure 13B:
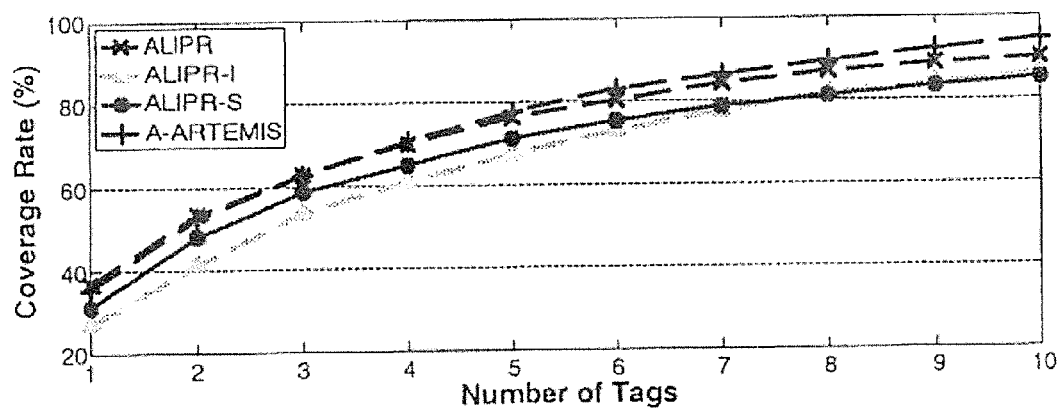

FIG. 13 presents the accuracy and coverage of annotation systems. The first annotation of A-ARTEMIS was accurate for nearly 35% of the images, and at least one correct tag was assigned to 90% images. ALIPR-S has about 85% overall coverage and 30% accuracy for the first annotation. Table VI illustrates annotations for example images.

VII. Summary

The need for image annotation techniques and benefits of automatic training data selection are well known. In this paper, we presented ARTEMIS, an approach to harvest training data from noisy user-tagged images. To deal with noise, we developed an instance-weighted mixture modeling algorithm and efficiently solved the optimization problem using hypothetical local mapping. The selected training data was evaluated with numerous baselines on standard benchmarking datasets and used to develop real image annotation systems. However, some potential issues may be addressed before further developing a comprehensive image annotation systems using larger training data as well as annotation vocabulary.

Figure 14A:
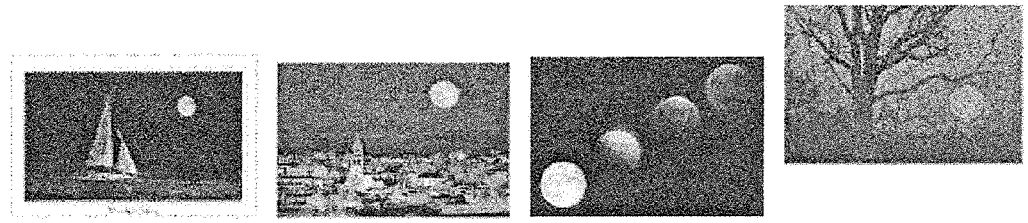
FIGS. 14A-14B show the failures identified in image ranking experiments point to potential pitfalls in ARTEMIS.

Because image selection is based on a global likelihood, ARTEMIS may aggressively prune the long tail of relevant image distribution along with noise. FIG. 14A shows false negative detections in the concept 'moon'. Additional processing may be required to enhance the treatment of long tailed distributions.

Figure 14B:
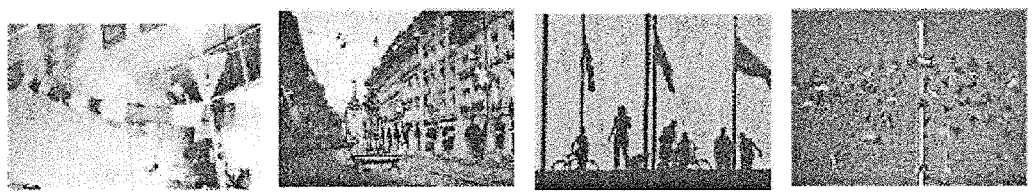

The performance of ARTEMIS is prone to extreme noise levels. FIG. 14B shows examples of one such concept 'flags', where the object of interest appears in a variety of color, shapes, sizes, and background. Only a small portion of each image is actually covered by the object which means that features introduce more noise than signal. In this case, the best strategy to select training examples was in fact a simple tag-based retrieval and all statistical modeling techniques performed poorly.

The system operates on a single heuristically tuned parameter, which should ideally be tuned in a concept-specific manner to improve performance. We believe that an interactive visualization tool to analyze the effects of K and relevance feedback can give practitioners more control on the selection behavior.

While we incorporated an LDA-based tag representation as a feature for mixture modeling, the data selection process for each tag is independent. In our continuing work, we are considering the integration of external knowledge databases such as WordNet to share semantic evidence between training data selection tasks of two labels. For instance, the ranking of an image for a concept 'animal' should be boosted when it is already highly ranked for a related concept such as 'bear'.

APPENDIX

Benchmark Concept List

The list of benchmark concepts used in our experiments: airport, animal, beach, bear, birds, boats, book, bridge, buildings, cars, castle, cat, cityscape, clouds, coral, cow, dancing, dog, earthquake, elk, fish, flags, flowers, food, fox, frost, garden, glacier, grass, harbor, horses, house, lake, leaf military, moon, mountain, nighttime, ocean, person, plane, plants, police, protest, railroad, rainbow, reflection, road, rocks, running, sand, sign, sky, snow, soccer, sports, statue, street, sun, sunset, surf temple, tiger, tower, town, toy, train, tree, valley, vehicle, water, waterfall, wedding, window, zebra.

Convergence Proof

The convergence of the proposed algorithm can be proved using Zangwill's Global Convergence Theorem (GCT) in the classical framework presented by Wu and Nettleton.

Theorem 1 (Global Convergence Theorem): Let M be a point-to-set map on $\Phi$ that given a point $\phi^{(0)}$ generates a sequence $\{\phi^{(t)}\}_{t=1}^{\infty}$ through the iteration $\phi^{(t+1)} \in M(\phi^{(t)})$. Let a solution set $\Gamma \subseteq \Phi$ be given, and suppose that 1. There is a continuous function $\alpha$ on $\Phi$ such that
   (a) if $\phi \notin \Gamma$, then $\alpha(\phi') > \alpha(\phi)$, $\forall \phi' \in M(\phi)$,
   (b) if $\phi \in \Gamma$, then $\alpha(\phi') \geq \alpha(\phi)$, $\forall \phi' \in M(\phi)$.
2. Map M is closed over the complement of $\Gamma$.
3. All points $\phi^{(t)}$ are contained in a compact set $S \subseteq \Phi$.

Then, all limit points of any convergent sub-sequence $\{\phi^{(t)}\}_{t=1}^{\infty}$ are in the solution set $\Gamma$ and $\alpha(\phi^{(t)})$ converges monotonically to $\alpha(\phi)$ for some $\phi \in \Gamma$.

To apply GCT, we first propose following equivalences:

Let $\Phi$ denote the joint domain of sample weights and distribution parameters i.e., $\Phi = w \times \Theta$.

Let $M: \Phi \to \Phi$ denote the instance weighted EM algorithm whose single iteration is a sequence of one expectation and two conditional maximization steps.

Let $\alpha$ denote the objective i.e., the constrained weighted likelihood function F.

In what follows, we prove the necessary conditions to apply GCT (monotonic ascendance, closure, and compactness).

Monotonic Ascendance

Recall the objective function, which is evidently continuous and differentiable.

$$F(V; \Theta, W) = \sum_{i=1}^{N} w_i \log \sum_{j=1}^{J} p(v_i, c_j | \Theta) - \kappa \sum_{i=1}^{N} w_i \log w_i.$$

The monotonic ascendance is explained using three lemmas, individually dealing with the single expectation and two conditional maximization steps.

Lemma 1: The expectation step maximizes F by setting $Q_i(c_j) = p(c_j | v_i)$.

Proof: This lemma is an extension of the classical EM analysis. In complete data log-likelihood scenario, the objective can be re-written as $$F = \sum_{i=1}^{N} w_i \log \sum_{j=1}^{J} y_{ij} p(v_i, c_j | \Theta_j) - \kappa \sum_{i=1}^{N} w_i \log w_i. \quad (15)$$

where $y_{ij} = 1$ if $v_i$ is generated by $c_j$, else $y_{ij} = 0$. Consequently $$\sum_j y_{ij} = 1$$

and $y_{ij} \geq 0, \forall j$. Since $y_{ij}$ are unobserved, the expectation step learns a continuous distribution Q over values of y to maximize $$\tilde{F} = \sum_{i=1}^{N} w_i \log \sum_{j=1}^{J} Q_i(C_j) p(v_i, c_j | \Theta_j) - \kappa \sum_{i=1}^{N} w_i \log w_i.$$

Clearly, the objective will be maximized if $Q_i(c_j)$ is proportional to $P(v_i, c_j | \Theta)$.

Normalizing to unit sum, we find that F will be maximized if $$Q_i(c_j) \frac{P(v_i, c_j | \Theta)}{\sum_j P(v_i, c_j | \Theta)} = p(c_j | v_i; \Theta).$$

Lemma 2: If $\forall i, j$, $w_i$ and $Q_i(c_j)$ are fixed, the objective reaches a unique global maximum if and only if $$c_{h,f} = \frac{\sum_i w_i Q_i(c_h) v_{i,f}}{\sum_i w_i Q_i(c_h)}.$$

Proof: In this case, the Hessian matrix of $\tilde{F}$ with respect to $c_{h,f}$ is $$-2 \times \text{diag}\left(\sum_i w_i Q_i(c_1), \sum_i w_i Q_i(c_2), \ldots, \sum_i w_i Q_i(c_J)\right).$$

The matrix is evidently negative definite which means the objective reaches a unique global maximum if and only if $$c_{h,f} = \frac{\sum_i w_i Q_i(c_h) v_{i,f}}{\sum_i w_i Q_i(c_h)}.$$

Lemma 3: If $\forall i, j$, $c_j$ and $Q_i(c_j)$ are fixed, the objective reaches a unique global maximum if and only if $$w_i = e^{\frac{l_i}{\kappa}} / \sum_m e^{\frac{l_m}{\kappa}}.$$

Proof: In this case, the Hessian matrix of $\tilde{F}$ with respect to $w_i$ is $\text{diag}(-w_1, -w_2, \ldots, -w_n)$. It is evidently a negative definite diagonal matrix. Therefore, the objective reaches a unique global maximum if and only if $$w_i = e^{\frac{l_i}{\kappa}} / \sum_m e^{\frac{l_m}{\kappa}}.$$

Each lemma is unique and deals with an independent component of $\Phi$. Further, the iteration mapping $M^{(t)}: \phi^{(t)} \to \phi^{(t+1)}$ does not depend on t. Therefore, the lemmas put together, prove that a bounded sequence $F(\phi^{(t)})$ ascends monotonically.

Closure of M

An algorithm $M: \Phi \to \Phi$ is closed if there exist $\phi \in \Gamma$ and $\zeta \in \Gamma$ such that $\zeta^{(t)} \to \zeta$ as $\phi^{(t)} \to \phi$, and $\zeta^{(t)} \in M(\phi^{(t)})$ implies that $\zeta \in M(\phi)$.

In each iteration of the proposed algorithm, M is a point-to-point map given the monotonic ascendance to global optimum. As a special case of point-to-set maps, M is trivially closed for point-to-point mapping because function continuity is a sufficient condition to imply closure.
Compactness of M Each iteration of the algorithm converges to a unique global optimizer and map M contains a single point. Therefore, all points $\phi^{(t)}$ are contained in a compact set $S \subset \Phi$.

In summary, the algorithm satisfies all necessary conditions to ensure robust convergence behavior using GCT.

REFERENCES

The following references are incorporated herein, in their entirety, by reference.

[1] S. Choi and R. Wette, "Maximum likelihood estimation of the parameters of the gamma distribution and their bias," *Technometrics*, vol. 11, no. 4, pp. 683-690, 1969.

[2] J. Li and J. Z. Wang, "Real-time computerized annotation of pictures," *IEEE Trans. Pattern Anal. Mach. Intell.*, vol. 30, no. 6, pp. 985-1002, 2008.

[3] X. Phan, L. Nguyen, and S. Horiguchi, "Learning to classify short and sparse text & Web with hidden topics from large-scale data collections," in *Proc. WWW*, 2008, pp. 91-100.

As will be clear to those of skill in the art, the described embodiments of the present invention may be altered in various ways without departing from the scope or teaching of the present invention. It is the following claims, including all equivalents, which define the scope of the present invention.

The invention claimed is:

1. A method of improving precision of training data used in automated image annotation, categorization, recognition, understanding, or retrieval, comprising the steps of:
   providing a digital computer;
   receiving at the digital computer a plurality of digital images, all the images previously tagged with a target concept;
   executing an algorithm on the digital computer to perform the following operations:
   (a) extracting visual and textual features from each of the tagged images,
   (b) variably weighting the images based upon the extracted features, the weight of the image reflecting a relevance of the image to the concept,
   (c) learning a reference model for the images representing the target concept, wherein the reference model is a mixture model based on the weighted images, the mixture model being a parametric probabilistic model having mixture parameters, the weight of each image parameterized on the mixture parameters, and both the mixture parameters and the weights of the images being learned during the learning of the reference model to curb contributions of noisy images;
   (d) retaining images with high likelihood of correct tagging based upon the reference model,
   (e) iterating the steps (b) and (c) using the retained images: and
   using learned reference model to train an automated image annotation, categorization, recognition, understanding, or retrieval system.

2. The method of claim 1, including the steps of
   performing the following operations on the digital computer:
   an initialization step wherein equal weights are assigned to all of the tagged images
   retaining the tagged images by ranking the tagged images in a decreasing order of a likelihood of the image, the likelihood of each image being parameterized on the mixture parameters and reflecting the likelihood of correct tagging.

3. The method of claim 1, further comprising the step of providing a reference model for each of a plurality of concepts, wherein the tagged images are processed one concept at a time.

4. The method of claim 3, wherein an image tagged with multiple concepts is used in learning reference models of all the concepts which the image is tagged with and the image is weighted differently for different concepts.

5. The method of claim 3, wherein the reference models for the plurality of image concepts are stored in a database for future use.

6. The method of claim 1, wherein the tagged images are noisy, user-tagged images obtained from the Internet.

7. The method of claim 1, wherein the iterating stops when the algorithm converges to identify a high-density region of relevant images corresponding to a high likelihood of correct tagging, thereby improving the precision of training data selection.

8. The method of claim 1, wherein the mixture model is estimated via hypothetical local mapping.

9. The method of claim 1, wherein both the visual features and textual features are part of a jointly parameterized model using common parameters.

10. The method of claim 1, wherein the variably changing weight of each tagged image is proportional to the mixture likelihood of the tagged image.

* * * * *